(12) United States Patent
Kim et al.

(10) Patent No.: US 12,537,177 B2
(45) Date of Patent: Jan. 27, 2026

(54) PLASMA DIAGNOSTIC CIRCUIT INCLUDING VARIABLE AMPLIFICATION UNIT AND METHOD OF OPERATING THE SAME

(71) Applicant: SAMSUNG ELECTRONICS CO., LTD., Suwon-si (KR)

(72) Inventors: Juhyun Kim, Suwon-si (KR); Haewook Park, Suwon-si (KR); Younsok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 18/389,713

(22) Filed: Dec. 19, 2023

(65) Prior Publication Data

US 2024/0429034 A1  Dec. 26, 2024

(30) Foreign Application Priority Data

Jun. 26, 2023 (KR) .......................... 10-2023-0082111

(51) Int. Cl.
  *H01J 37/32* (2006.01)
  *H03F 3/45* (2006.01)
(52) U.S. Cl.
  CPC .......... *H01J 37/32917* (2013.01); *H01J 2237/24564* (2013.01); *H03F 3/45475* (2013.01)
(58) Field of Classification Search
  CPC ..... G01R 1/072; G01R 31/2831; G01R 27/26
  (Continued)

(56) References Cited

U.S. PATENT DOCUMENTS 7,351,297 B2  4/2008  Middlesworth et al.
7,696,758 B2  4/2010  Chung et al.
  (Continued)

FOREIGN PATENT DOCUMENTS

CN     113179574 A    7/2021
KR   20050003484 A    1/2005
  (Continued)

OTHER PUBLICATIONS

Kim, Jin-Yong , et al., "Wireless wafer-type probe system for measurement of two-dimensional plasma parameters and spatial uniformity", Measurement Science and Technology, vol. 24, No. 9, Sep. 2013, 9 pp.

(Continued)

*Primary Examiner* — Roberto Velez
(74) *Attorney, Agent, or Firm* — Wolf, Greenfield & Sacks, P.C.

(57) ABSTRACT

A plasma diagnostic circuit includes a signal generator that outputs a first alternating current (AC) signal to a first reference node, a variable diagnostic circuit that includes a default electronic element connected between the first reference node and a measurement node and floated other electronic elements, a first probe that is connected to the measurement node and is exposed to plasma in a chamber, a differential amplifier that amplifies a difference between a first voltage of the first reference node and a second voltage of the measurement node and generates an analysis signal, and a selection controller that outputs a selection signal to the variable diagnostic circuit responsive to the analysis signal, wherein the selection signal indicates a target electronic element among the floated other electronic elements.

20 Claims, 15 Drawing Sheets

(58) Field of Classification Search
USPC .......................................... 324/649, 754.24
See application file for complete search history.

(56) References Cited

U.S. PATENT DOCUMENTS

| | | | |
|---|---|---|---|
| 7,832,749 | B2 | 11/2010 | Lee |
| 9,074,285 | B2 | 7/2015 | Pease et al. |
| 9,129,779 | B2 | 9/2015 | Booth et al. |
| 9,754,770 | B2 * | 9/2017 | Jeon ................. H01J 37/32954 |
| 2008/0265903 | A1 * | 10/2008 | Chung ................. H05H 1/0081 |
| | | | 324/464 |
| 2015/0076328 | A1 | 3/2015 | Jung et al. |
| 2024/0280631 | A1 * | 8/2024 | Yamakaji ........... G01R 31/2874 |

FOREIGN PATENT DOCUMENTS

| | | | |
|---|---|---|---|
| KR | 20060051489 | A | 5/2006 |
| KR | 100784824 | B1 | 12/2007 |
| KR | 20100011845 | A | 2/2010 |
| KR | 20100106088 | A | 10/2010 |
| KR | 101447639 | B1 | 10/2014 |

OTHER PUBLICATIONS

Lee, Min-Hyong, et al., "Floating probe for electron temperature and ion density measurement applicable to processing plasmas", Journal of Applied Physics, vol. 103, No. 3, Feb. 2007, 6 pp.

Oh, Se-Jin, et al., "Double probe diagnostics based on harmonic current detection for electron temperature and electropositive ion flux measurement in RF plasmas", Measurement Science and Technology, vol. 23, No. 8, Aug. 2012, 6 pp.

* cited by examiner

FIG. 5

| Look Up Table | | | | |
|---|---|---|---|---|
| Probe Area(X) | Threshold Current Value(Y) | Current Value(Z) | Amplification Factor(F) | Selection Signal (SEL) |
| X1 | Y1 | Z1 | F11 | SEL11 |
|  |  | ... | ... | ... |
|  |  | ZN | F1N | SEL1N |
| X2 | Y2 | Z1 | F21 | SEL21 |
|  |  | ... | ... | ... |
|  |  | ZN | F2N | SEL2N |
| ... | ... | ... | ... | ... |
| XM | YM | Z1 | FM1 | SELM1 |
|  |  | ... | ... | ... |
|  |  | ZN | FMN | SELMN |

FIG. 6

| Probe Area(X) | Threshold Current Value(Y) | Look Up Table | | |
|---|---|---|---|---|
| | | Current Value(Z) | Amplification Factor(F) | Selection Signal (SEL) |
| X1 | Y1 | Z1 | F11 | SEL11 |
| | | ⋮ | ⋮ | ⋮ |
| | | Zn−1 | F1n−1 | SEL1n−1 |
| | | Zn(=Th1) | F1n | SEL1n |
| | | ⋮ | ⋮ | ⋮ |
| | | Zm(=Th2) | F1m | SEL1m |
| | | Zm+1 | F1m+1 | SEL1m+1 |
| | | ⋮ | ⋮ | ⋮ |
| | | ZN | F1N | SEL1N |

1st Abnormal Region: rows Z1 through Zn−1
Linear Region: rows Zn through Zm
2nd Abnormal Region: rows Zm+1 through ZN

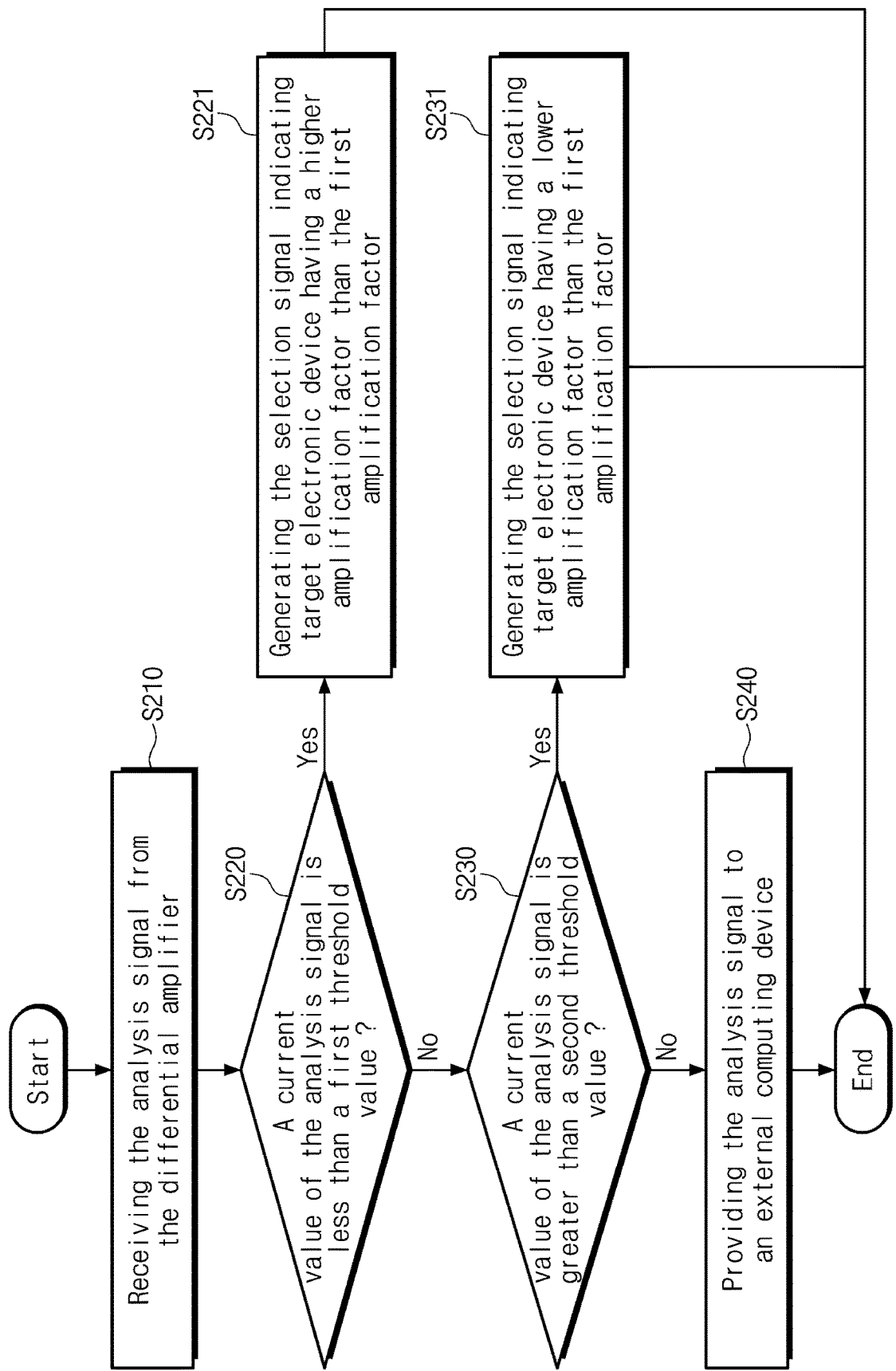

PLASMA DIAGNOSTIC CIRCUIT INCLUDING VARIABLE AMPLIFICATION UNIT AND METHOD OF OPERATING THE SAME

CROSS-REFERENCE TO RELATED APPLICATIONS

This application claims priority under 35 U.S.C. § 119 to Korean Patent Application No. 10-2023-0082111 filed on Jun. 26, 2023, in the Korean Intellectual Property Office, the disclosure of which is incorporated by reference herein in its entirety.

BACKGROUND

Embodiments of the present disclosure described herein relate to a plasma diagnostic circuit, and more particularly, relate to a plasma diagnostic circuit including a variable amplification unit and an operating method thereof.

A target circuit or pattern may be formed by applying etching and deposition processes to a substrate used in a semiconductor process. Plasma is used in the etching and deposition processes. Because appropriate plasma density and energy are determined for each semiconductor process, the accurate diagnosis and control of the plasma density and energy may have an important effect on the semiconductor quality.

Also, in an existing plasma diagnostic circuit, a measurable range of an ion current for each probe area is fixed. This may make it difficult for the existing plasma diagnosis circuit to diagnose various states of plasma accurately. Also, in the existing plasma diagnosis circuit, there is a need to change a probe or a circuit configuration of the plasma diagnostic circuit depending on a plasma state. That is, the efficiency of the existing plasma diagnostic circuit is low.

SUMMARY

Embodiments of the present disclosure provide a plasma diagnostic circuit including a variable amplification unit and an operating method thereof.

According to an embodiment, a plasma diagnostic circuit includes a signal generator that outputs a first alternating current (AC) signal to a first reference node, a variable diagnostic circuit that includes a plurality of electronic elements, wherein one of the plurality of electronic elements is a default electronic element connected between the first reference node and a measurement node, and other ones of the plurality of electronic elements are floated, a first probe that is connected to the measurement node, wherein the first probe is exposed to plasma in a chamber, a differential amplifier that amplifies a difference between a first voltage of the first reference node and a second voltage of the measurement node and generates an analysis signal, and a selection controller that outputs a selection signal to the variable diagnostic circuit responsive to the analysis signal, wherein the selection signal indicates a target electronic element among the plurality of electronic elements.

According to an embodiment, an operating method of a plasma diagnostic circuit which includes a signal generator, a variable diagnostic circuit, a first probe, a differential amplifier, and a selection controller includes outputting, by the signal generator, a first AC signal to a first reference node, generating, by the differential amplifier, an analysis signal by amplifying a difference between a first voltage of the first reference node and a second voltage of a measurement node, wherein one of a plurality of electronic elements of the variable diagnostic circuit is a default electronic element that is connected to the first reference node and the measurement node, and the measurement node is connected to the first probe exposed to plasma in a chamber, and outputting, by the selection controller, a selection signal to the variable diagnostic circuit responsive to the analysis signal, wherein the selection signal indicates a target electronic element among floated other ones of the plurality of electronic elements.

According to an embodiment, a plasma diagnostic circuit includes a signal generator that outputs a first AC signal to a first reference node and outputs a second AC signal to a second reference node, a variable diagnostic circuit that includes a plurality of electronic elements, wherein one of the plurality of electronic elements is a default electronic element connected between the first reference node and a measurement node, and other ones of the plurality of electronic elements are floated, a first probe that is connected to the measurement node and is exposed to plasma in a chamber, a second probe that is connected to the second reference node and is exposed to the plasma in the chamber and is spaced apart from the first probe, a differential amplifier that amplifies a difference between a first voltage of the first reference node and a second voltage of the measurement node and generates an analysis signal, and a selection controller that outputs a selection signal to the variable diagnostic circuit responsive to the analysis signal, wherein the selection signal indicates a target electronic element among the floated other ones of the plurality of electronic elements.

BRIEF DESCRIPTION OF THE FIGURES

The above and other objects and features of the present disclosure will become apparent by describing in detail embodiments thereof with reference to the accompanying drawings.

FIG. 5 is a table describing an LUT according to some embodiments of the present disclosure.

FIG. 6 is a table describing an LUT according to some embodiments of the present disclosure.

FIG. 14 is a flowchart describing an operating method of a selection controller according to some embodiments of the present disclosure.

DETAILED DESCRIPTION

Below, embodiments of the present disclosure will be described in detail and clearly to such an extent that one skilled in the art carries out embodiments of the present disclosure easily.

Figure 1:
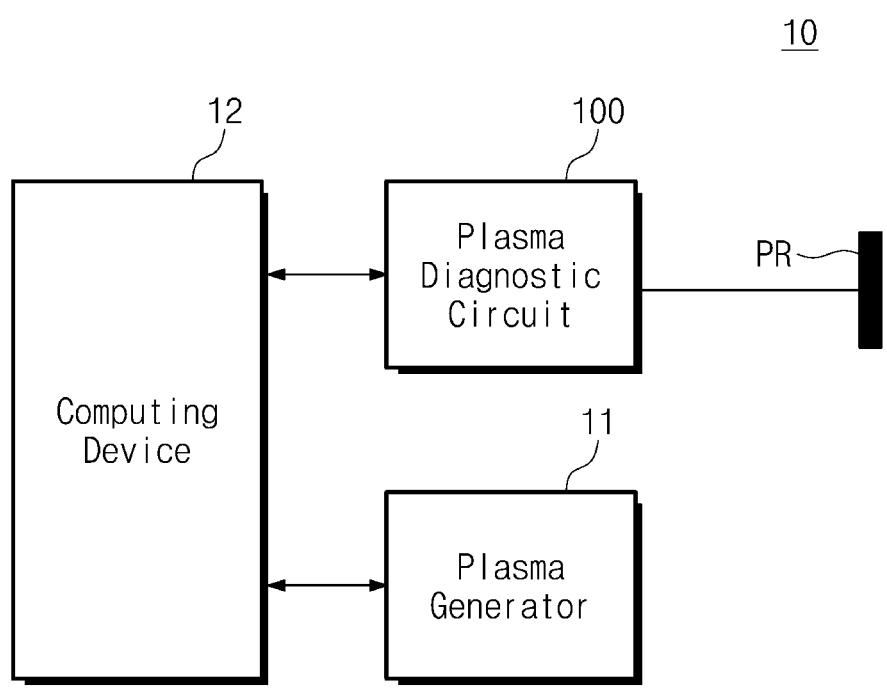
FIG. 1 is a diagram illustrating an electronic device according to an embodiment of the present disclosure.

FIG. 1 is a diagram illustrating an electronic device according to an embodiment of the present disclosure. Referring to FIG. 1, an electronic device 10 may include a chamber, a plasma generator 11, a computing device 12, a plasma diagnostic circuit 100, and a probe PR.

The electronic device 10 may diagnose the plasma generated in the chamber used in a semiconductor process and may adjust the density and energy of the plasma so as to be appropriate for each semiconductor process.

The plasma generator 11 may generate the plasma in the chamber. For example, the plasma generator 11 may generate the plasma in the chamber by supplying a power to a terminal installed in the chamber. The power that the plasma generator 11 supplies may be a radio frequency (RF) power. As the power that the plasma generator 11 supplies increases, the plasma density and energy may increase.

The plasma diagnostic circuit 100 may generate an analysis signal corresponding to the plasma density and energy in the chamber. The analysis signal may include a chamber ion current value. The ion current may refer to a current flowing from the plasma through the probe PR. Accordingly, because the plasma density and energy are obtained based on the ion current, to obtain the plasma density and energy, the plasma diagnostic circuit 100 may generate the analysis signal by exposing the probe PR to the plasma.

However, a range of a measurable ion current value of the plasma diagnostic circuit 100 may be determined in advance. The minimum (or lower limit) value of the range of the measurable ion current value may be referred to as a "first threshold value", and the maximum (or upper limit) value thereof may be referred to as "second threshold value".

In some embodiments, the first threshold value may be determined by a resolution of an analog-to-digital (ADC) that the plasma diagnostic circuit 100 includes. When the ion current is smaller than the resolution of the ADC, even though the plasma exists, the ion current may be expressed to be "0".

In some embodiments, the second threshold value may be determined by the probe PR that the plasma diagnostic circuit 100 uses. For example, the second threshold value may be determined by the area of the probe PR. This will be described in detail with reference to FIG. 2.

In some embodiments, the plasma diagnostic circuit 100 may be disposed in the chamber.

The plasma diagnostic circuit 100 may provide the analysis signal to the computing device 12. The plasma diagnostic circuit 100 will be described in detail with reference of FIGS. 3A, 3B, and 4.

The computing device 12 may receive the analysis signal from the plasma diagnostic circuit 100 and may control the plasma generator 11 based on (i.e., responsive to) the analysis signal.

In some embodiments, the computing device 12 may store plasma parameter values for each semiconductor process. The computing device 12 may compare the analysis signal with the stored plasma parameter values and may control the plasma generator 11 such that the plasma corresponding to the stored plasma parameter values is generated in the chamber.

For example, when the plasma density of the analysis signal is smaller than the stored plasma density, the computing device 12 may control the plasma generator 11 such that the RF power supplied to the chamber increases. In contrast, when the plasma density of the analysis signal is greater than the stored plasma density, the computing device 12 may control the plasma generator 11 such that the RF power supplied to the chamber decreases.

The probe PR may be inserted into the chamber and may be exposed to the plasma in the chamber. The probe PR may be affected by the plasma in the chamber. For example, the probe PR may provide the plasma diagnostic circuit 100 with an electrical signal corresponding to a plasma density, an ion flux, and an electron temperature in the chamber. The probe PR may be classified as a wired probe, such as a Langmuir probe or a cut-off probe, or a wireless probe, such as a floating probe, depending on a probe measurement scheme. For example, the probe PR may be the floating probe. However, even though probes are of the same kind, the probes may have different probe areas.

A range of a measurable ion current value of a plasma diagnostic device may be determined depending on the area of the probe PR. For example, in the same plasma diagnostic circuit, the maximum value of the ion current capable of being measured by using a first probe may be different from the maximum value of the ion current capable of being measured by using a second probe whose area is different from that of the first probe.

In some embodiments, the computing device 12 may store information about the area of the probe PR and information about a threshold current value of the probe PR. The threshold current value of the probe PR may refer to the maximum value of the measurable ion current. The computing device 12 may provide the information about the area of the probe PR and the information about the threshold current value of the probe PR to the plasma diagnostic circuit 100. This will be described in detail with reference to FIGS. 4, 5, and 6.

Figure 2:
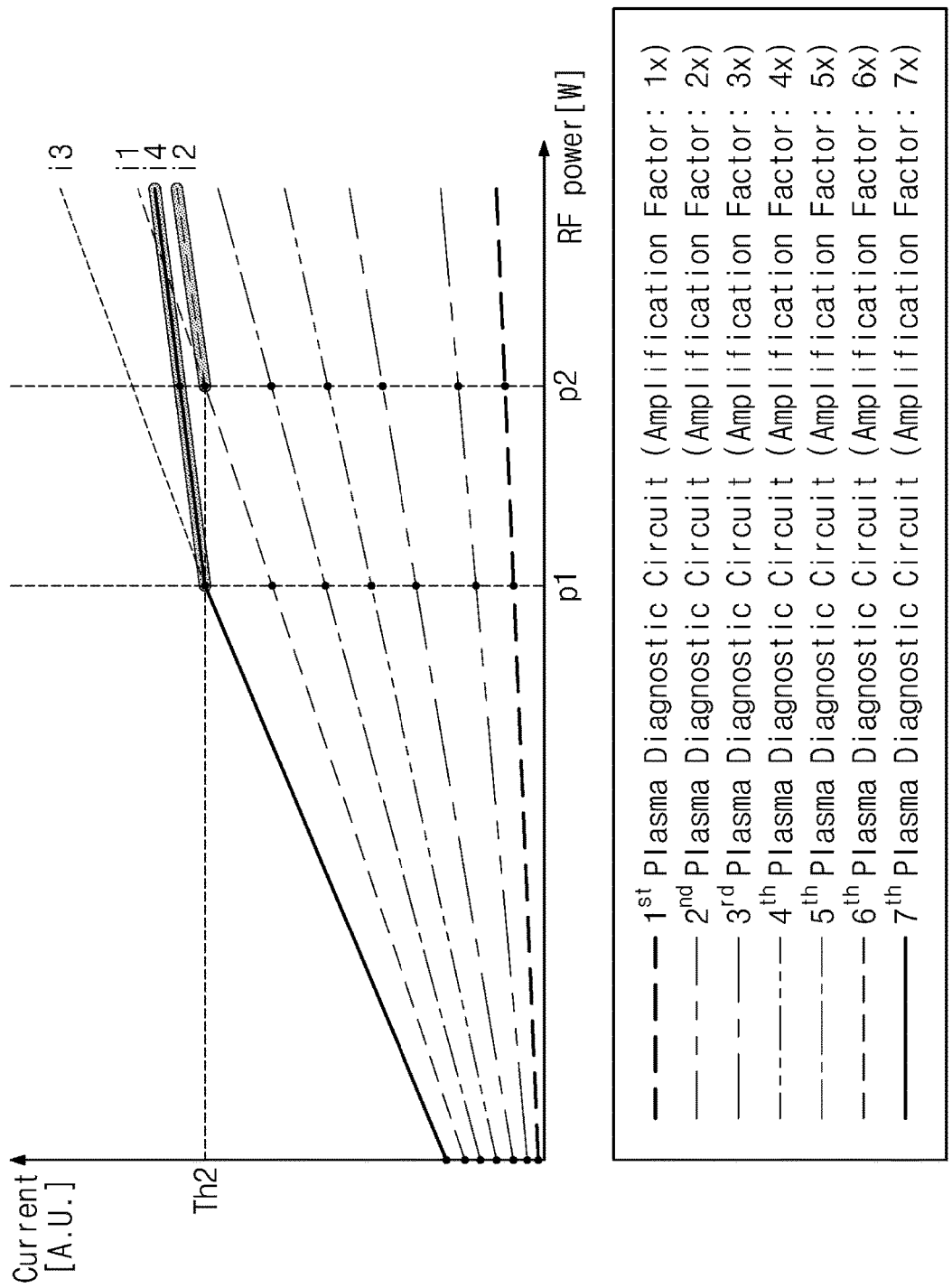
FIG. 2 is a graph illustrating how a current value changes depending on a supply power of each of plasma diagnostic circuits with different amplification factors.

FIG. 2 is a graph illustrating how a current value changes depending on a supply power of each of plasma diagnostic circuits with different amplification factors. A change in a current value according to a supply power of each of 7 plasma diagnostic circuits with different amplification factors is illustrated in FIG. 2.

The current value of FIG. 2 may be included in an analysis signal that a conventional plasma diagnostic circuit generates. The analysis signal may refer to an electrical signal corresponding to a current flowing through a probe. For example, the analysis signal may refer to an electrical signal (e.g., an amplified current) that is obtained by amplifying an electrical signal (e.g., a current) flowing through a probe by using sub-components (e.g., a variable diagnostic circuit and a differential amplifier to be described with reference to FIGS. 3A and 3B) of a plasma diagnostic circuit. Also, the analysis signal may include current values for the respective frequencies.

In some embodiments, a computing device outside the plasma diagnostic circuit may calculate an ion current value based on the current values respectively corresponding to the plurality of frequencies.

In some embodiments, the current value of FIG. 2 may refer to a current value, which corresponds to a frequency identical to a frequency of an AC signal output from a signal generator of a conventional plasma diagnostic circuit, from among the current values that the analysis signal includes.

It is assumed that 7 plasma diagnostic circuits of FIG. 2 have the same conditions except for an amplification factor.

In the graph of FIG. 2, a horizontal axis represents an RF power that a plasma generator supplies to the chamber, and a vertical axis represents a current value.

As described with reference to FIG. 1, as the RF power increases, the plasma density may increase; in this case, an ion current value may increase. That is, the ion current value may be proportional to the RF power. As the ion current value increases, the current value of the analysis signal flowing through the probe may increase. In the actual plasma diagnostic circuit, the current value of the analysis signal may not be completely proportional to the RF power due to various internal and external factors of the plasma diagnostic circuit; however, to describe the measurable ion current of the conventional plasma diagnostic circuit, the description will be given with reference to FIG. 2 under the assumption of the ideal situation where the current value of the analysis signal is completely proportional to the RF power.

The plasma diagnostic circuit may measure the ion current value through the probe on the premise of the amplification operation. The amplification operation may refer to an operation of amplifying an electrical signal corresponding to the plasma in the chamber based on the amplification factor. In this case, the amplification factor may be determined by the impedance of each of one or more electronic elements that the plasma diagnostic circuit includes. For example, as the amplification factor increases, an impedance value may increase. The electronic element will be described in detail with reference to FIGS. 3A, 3B, and 4.

Referring again to FIG. 2, the plasma diagnostic circuits are respectively expressed by different kinds of lines.

For example, the first plasma diagnostic circuit with the 1× amplification factor is expressed by a dotted line with a first interval. The second plasma diagnostic circuit with the 2× amplification factor is expressed by a dotted line with a second interval. The third plasma diagnostic circuit with the 3× amplification factor is expressed by a dotted line with a third interval. The fourth plasma diagnostic circuit with the 4× amplification factor is expressed by a dash-single dotted line. The fifth plasma diagnostic circuit with the 5× amplification factor is expressed by a dash-double dotted line. The sixth plasma diagnostic circuit with the 6× amplification factor is expressed by a dotted line with a fourth interval. The seventh plasma diagnostic circuit with the 7× amplification factor is expressed by a solid line.

Because the current value is proportional to the RF power, the graph of each of the first to seventh plasma diagnostic circuits increases with a uniform slope. In this case, the slope of the graph of the seventh plasma diagnostic circuit with the greatest amplification factor is the greatest. In other words, because the ratio of a current value variation to an RF power variation is greatest measured, the seventh plasma diagnostic circuit may diagnose the plasma density most accurately.

However, in the conventional plasma diagnostic circuit, the threshold current value may be determined depending on the area of the probe. Accordingly, when the measured current value is greater than the threshold current value, the ion current may already sufficiently flow through the probe; in this case, even the plasma density increases, the ion current may not increase any longer. That is, it is impossible to measure the plasma density accurately any longer.

For example, the threshold current value of the probe that the first to seventh plasma diagnostic circuits of FIG. 2 use may be a second threshold value Th2. The graph slope of the sixth plasma diagnostic circuit decreases from a first slope i1 to a second slope i2 from a point where there is supplied a second RF power p2 by which the current value reaches the second threshold value Th2. Likewise, the graph slope of the seventh plasma diagnostic circuit decreases from a first slope i3 to a second slope i4 from a point where there is supplied a first RF power p1 by which the current value reaches the second threshold value Th2 (refer to a shaded portion of a graph in FIG. 2).

In other words, in the case of the sixth plasma diagnostic circuit, when a power greater than the second RF power p2 is supplied, the current value may be greater than the second threshold value Th2, thereby causing a decrease in the accuracy of plasma diagnosis. Likewise, in the case of the seventh plasma diagnostic circuit, when a power greater than the first RF power p1 is supplied, the current value may be greater than the second threshold value Th2, thereby causing a decrease in the accuracy of plasma diagnosis.

In this case, a range in which accurate plasma diagnose is possible may be referred to as a "linear region". For example, a region where the current value is smaller than the second threshold value Th2 may be referred to as a "linear region". In contrast, a region where the current value is greater than the second threshold value Th2 may be referred to as an "abnormal region".

Accordingly, to maintain the accuracy of diagnose of the seventh plasma diagnostic circuit in a state where a power greater than the first RF power p1 is supplied thereto, there is a need to change a circuit configuration or replace the current probe with a probe whose area is different from the area of the current probe such that the amplification factor decreases.

In contrast, a plasma diagnostic circuit according to an embodiment of the present disclosure may maintain the accuracy of plasma diagnose by variably adjusting the amplification factor based on the measured current value, and thus, there is no need to change a circuit configuration or to change a probe. The plasma diagnostic circuit according to an embodiment of the present disclosure will be described in detail with reference to the following drawings.

Figure 3A:
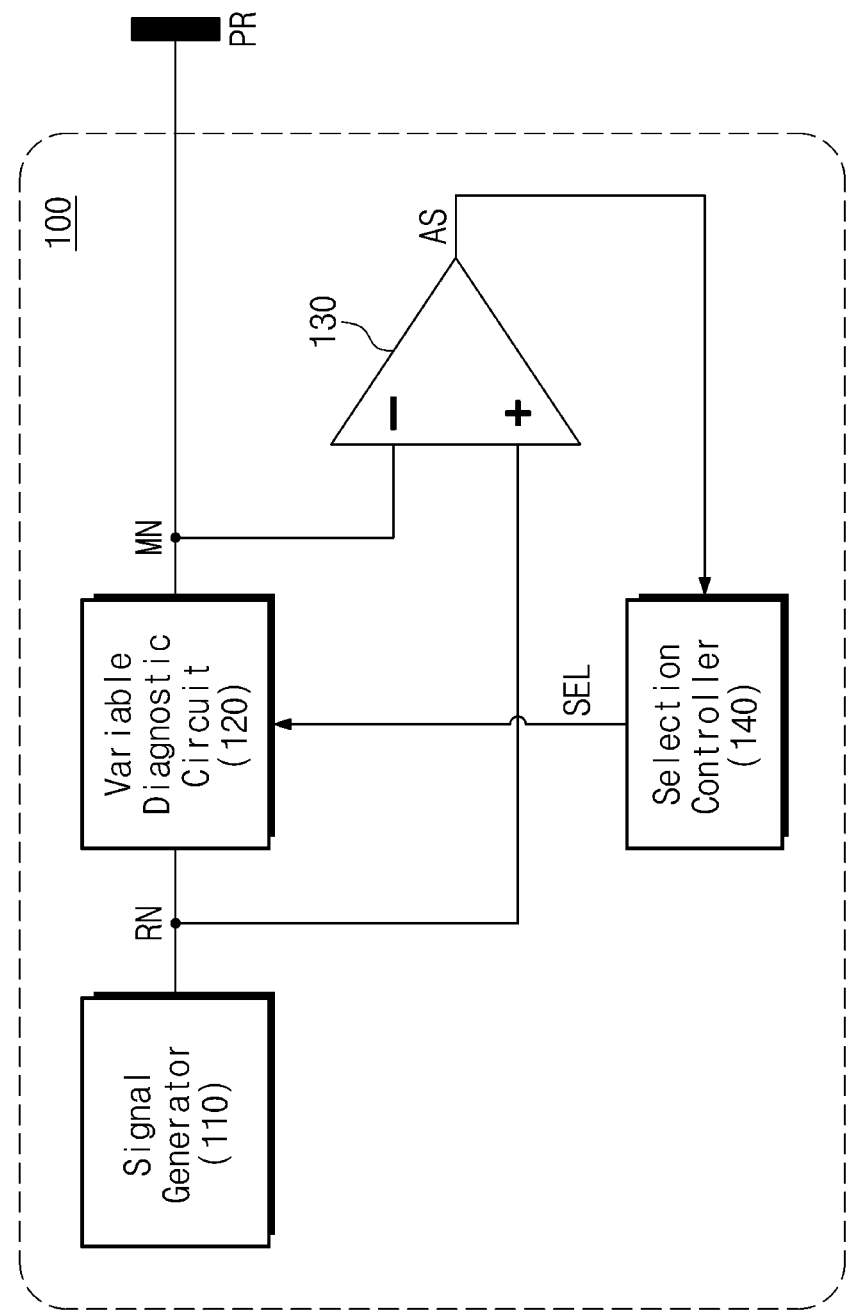
FIG. 3A is a circuit diagram of a plasma diagnostic circuit according to an embodiment of the present disclosure.

FIG. 3A is a circuit diagram of a plasma diagnostic circuit according to an embodiment of the present disclosure. The plasma diagnostic circuit 100 and the probe PR are illustrated in FIG. 3A. The plasma diagnostic circuit 100 and the probe PR of FIG. 3A may respectively correspond to the plasma diagnostic circuit 100 and the probe PR of FIG. 1.

The plasma diagnostic circuit 100 may include a signal generator 110, a variable diagnostic circuit 120, a differential amplifier 130, and a selection controller 140.

The signal generator 110 may output an alternating current (AC) signal to a reference node RN. For example, the AC signal may be a sinusoidal AC signal. For example, the signal generator 110 may include an AC power source, an oscillator, or a function generator.

In some embodiments, the signal generator 110 may further include a digital-to-analog converter.

In some embodiments, the signal generator 110 may further include an amplifier. The amplifier may output a first AC signal by amplifying an electrical signal generated from the oscillator or the function generator.

The variable diagnostic circuit 120 may be connected between the reference node RN and a measurement node MN. The variable diagnostic circuit 120 may include a plurality of electronic elements.

The variable diagnostic circuit 120 may include a default electronic element connected between the reference node RN and the measurement node MN and at least one other electronic element that is floated. The electronic elements that the variable diagnostic circuit 120 includes will be described in detail with reference of FIGS. 3B and 4.

The probe PR may be connected to the measurement node MN and may be exposed to the plasma in the chamber. When the plasma is present in the chamber, the plasma may have an impedance value. Although not illustrated in FIG. 3A, a current that flows to the variable diagnostic circuit 120 and the probe PR based on the AC signal may flow through a ground node of the plasma diagnostic circuit 100.

The differential amplifier 130 may amplify a difference between a first voltage of the reference node RN and a second voltage of the measurement node MN and may generate an analysis signal AS. The analysis signal AS may include a value of the current flowing to the variable diagnostic circuit 120 and the probe PR.

In detail, the differential amplifier 130 may generate the analysis signal AS based on the difference between the first voltage and the second voltage. For example, the differential amplifier 130 may obtain the current value of the analysis signal AS based on an impedance value of the default electronic element and the difference between the first voltage and the second voltage.

The analysis signal AS may include a value of the current flowing to the variable diagnostic circuit 120 and the probe PR. For example, the current value may be measured based on the impedance value of the default electronic element and the difference between the first voltage and the second voltage.

The selection controller 140 may generate a selection signal SEL based on the analysis signal AS. The selection signal SEL may indicate a target electronic element among the other electronic elements of the variable diagnostic circuit 120.

In some embodiments, the selection controller 140 may include a signal processor. The signal processor may perform signal processing with respect to the analysis signal AS and may generate a processed signal PS (refer to FIG. 3B). For example, the signal processor may perform at least one of filtering and FFT (Fast Fourier Transform) with respect to the analysis signal AS and may generate the processed signal PS. The processed signal PS may include a current value corresponding to a first frequency and a current value corresponding to a second frequency. The selection controller 140 may provide the processed signal PS to the computing device 12 of FIG. 1.

For example, the selection controller 140 may generate the selection signal SEL based on the current value corresponding to one of the first frequency and the second frequency received from the signal processor.

In some embodiments, a first impedance value of the default electronic element may be different from a second impedance value of the target electronic element.

In some embodiments, the selection controller 140 may determine whether the current value of the analysis signal AS is smaller than the first threshold value; in response to determining that the current value of the analysis signal AS is smaller than the first threshold value, the selection controller 140 may generate the selection signal SEL indicating the target electronic element having the second impedance value greater than the first impedance value of the default electronic element. In this case, the first threshold value that is determined in advance may indicate a threshold value at which, even though the plasma is generated, due to an ion current measured to be very small, the current value of the analysis signal AS is expressed to be "0" or the plasma density is calculated to be "0". For example, the first threshold value may be the resolution of the ADC.

In some embodiments, the selection controller 140 may determine whether the current value of the analysis signal AS is greater than the second threshold value; in response to determining that the current value of the analysis signal AS is greater than the first threshold value, the selection controller 140 may generate the selection signal SEL indicating the target electronic element having the second impedance value smaller than the first impedance value of the default electronic element. The second threshold value that is determined in advance may correspond to the second threshold value Th2 of FIG. 2. In other words, the second threshold value may be determined based on the area of the probe PR.

Figure 3B:
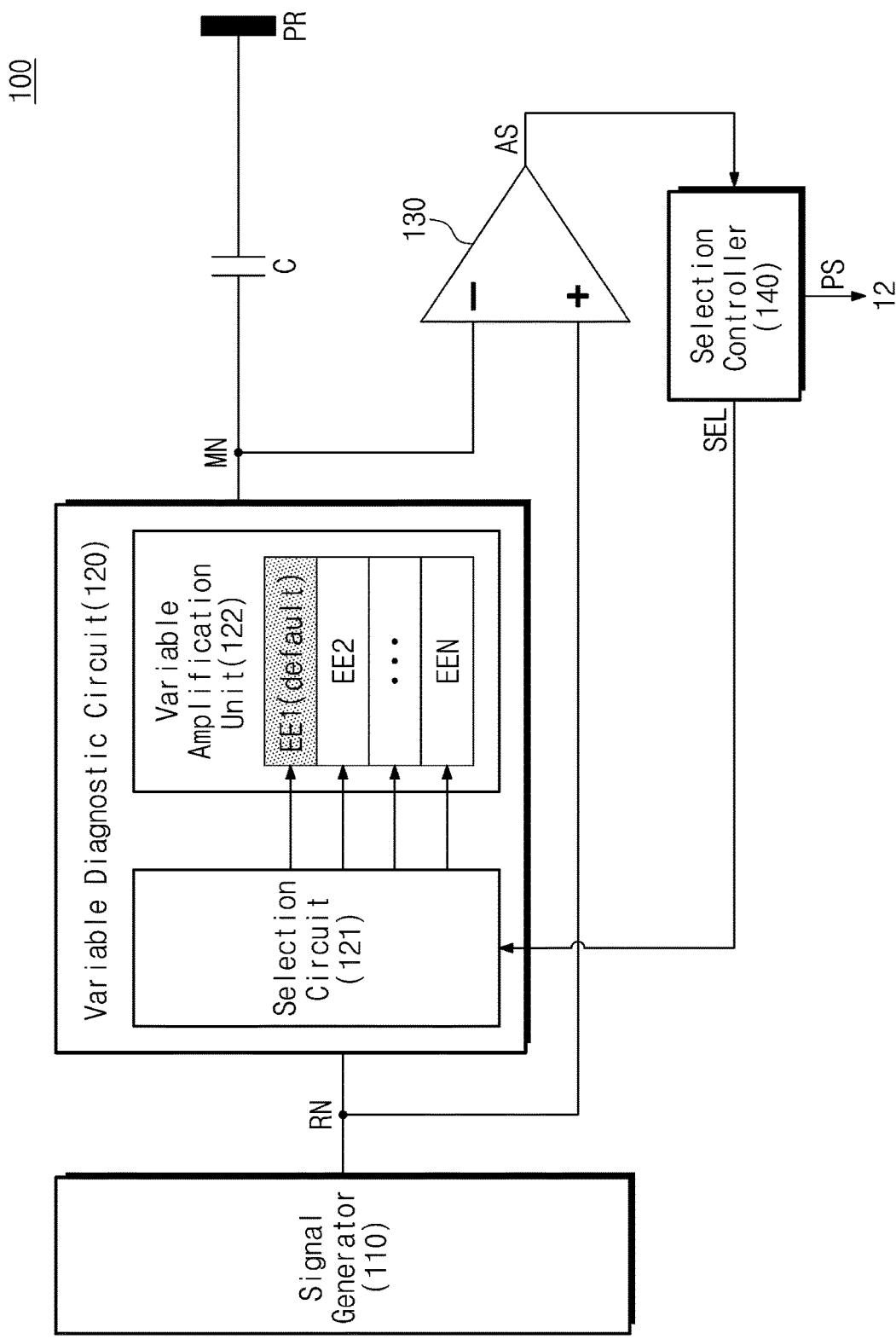
FIG. 3B is a circuit diagram of a plasma diagnostic circuit according to an embodiment of the present disclosure.

In some embodiments, the selection controller 140 may determine whether the current value of the analysis signal AS is greater than the first threshold value and is smaller than the second threshold value; in response to determining that the current value of the analysis signal AS is greater than the first threshold value and is smaller than the second threshold value, the selection controller 140 may not provide the selection signal SEL to a selection circuit 121 (refer to FIG. 3B). In other words, because the ion current value is included in the linear region, an electronic element connected between the reference node RN and the measurement node MN may not be changed from the default electronic element to any other electronic element. Although not illustrated in FIG. 3A, the selection circuit 121 may output the analysis signal AS to an external computing device.

In some embodiments, the selection controller 140 may be provided with the first threshold value, the second threshold value, and an area value of the probe PR from the external computing device. This will be described in detail with reference to FIG. 4.

In some embodiments, the selection controller 140 may generate the selection signal SEL with reference to the analysis signal AS and a lookup table (LUT). This will be described in detail with reference to FIGS. 4 to 6.

FIG. 3B is a circuit diagram of a plasma diagnostic circuit according to an embodiment of the present disclosure. The plasma diagnostic circuit 100, a capacitor "C", and the probe PR are illustrated in FIG. 3B. The plasma diagnostic circuit 100 and the probe PR of FIG. 3B may respectively correspond to the plasma diagnostic circuit 100 and the probe PR of FIG. 1.

The plasma diagnostic circuit 100 may include the signal generator 110, the variable diagnostic circuit 120, the differential amplifier 130, the selection controller 140, and the capacitor "C". The signal generator 110, the variable diagnostic circuit 120, the differential amplifier 130, the selection controller 140 of FIG. 3B respectively correspond to the signal generator 110, the variable diagnostic circuit 120, the differential amplifier 130, the selection controller 140 of FIG. 3A.

Additional description will be omitted to avoid redundancy.

The variable diagnostic circuit 120 may include the selection circuit 121 and a variable amplification unit 122. For convenience of description, the variable amplification unit 122 will be described below.

The variable amplification unit 122 may include a plurality of electronic elements. For example, the variable amplification unit 122 may include N electronic elements EE1 to EEN. Herein, "N" may be a natural number more than 1. For example, the first electronic element EE1 may be the default electronic element. The target electronic element may be one of the second to N-th electronic elements EE2 to EEN.

In some embodiments, each of the plurality of electronic elements EE1 to EEN may include at least one of a passive element and an active element. For example, each of the plurality of electronic elements EE1 to EEN may include at least one of a resistor, an inductor, a capacitor, and an operational (OP) amplifier.

The selection circuit 121 may select one of the plurality of electronic elements EE1 to EEN of the variable amplification unit 122 based on the selection signal SEL. The selection signal SEL may be a signal indicating the target electronic element. The selection circuit 121 may receive the selection signal SEL from the selection controller 140.

The selection circuit 121 may be an analog element or a digital element. For example, the selection circuit 121 may be a switch or a multiplexer.

Before receiving the selection signal SEL, the selection circuit 121 may select the first electronic element EE1 of the variable amplification unit 122. For example, the selection circuit 121 may be implemented with the switch, and the selection circuit 121 connects the first electronic element EE1 between the reference node RN and the measurement node MN. In this case, the remaining electronic elements may not be connected to at least one of the reference node RN and the measurement node MN. That is, the selection circuit 121 may float the remaining electronic elements.

When the selection signal SEL is received, the selection circuit 121 may connect the target electronic element of the variable amplification unit 122 between the reference node RN and the measurement node MN. For example, the target electronic element may be the second electronic element EE2. For example, the selection circuit 121 may be implemented with the switch, and the selection circuit 121 may disconnect the first electronic element EE1 from the reference node RN and may connect the second electronic element EE2 between the reference node RN and the measurement node MN.

The capacitor "C" may be connected between the measurement node MN and the probe PR. The capacitor "C" may provide the variable diagnostic circuit 120 with only an AC component of a current flowing to the probe PR.

Below, how the plasma diagnostic circuit 100 operates after the selection controller 140 transfers the selection signal SEL to the selection circuit 121 will be described in detail.

The selection circuit 121 may receive the selection signal SEL indicating the second electronic element EE2 from the selection controller 140. The selection circuit 121 may connect the second electronic element EE2 between the reference node RN and the measurement node MN. The selection circuit 121 may disconnect the first electronic element EE1 from at least one of the reference node RN and the measurement node MN. That is, the selection circuit 121 may float the first electronic element EE1.

Afterwards, the differential amplifier 130 may again amplify a difference between a third voltage of the reference node RN and a fourth voltage of the measurement node MN and may generate a re-analysis signal. The differential amplifier 130 may generate the re-analysis signal to be identical to the way to perform the operation of generating the analysis signal AS. The re-analysis signal may indicate the analysis signal AS generated after the selection circuit 121 is connected to the target electronic element.

The differential amplifier 130 may provide the re-analysis signal to the selection controller 140.

In some embodiments, the signal processor of the selection controller 140 may perform the filtering and FFT with respect to the re-analysis signal and may generate the processed signal PS. The selection controller 140 may provide the processed signal PS to the computing device 12 of FIG. 1.

Figure 4:
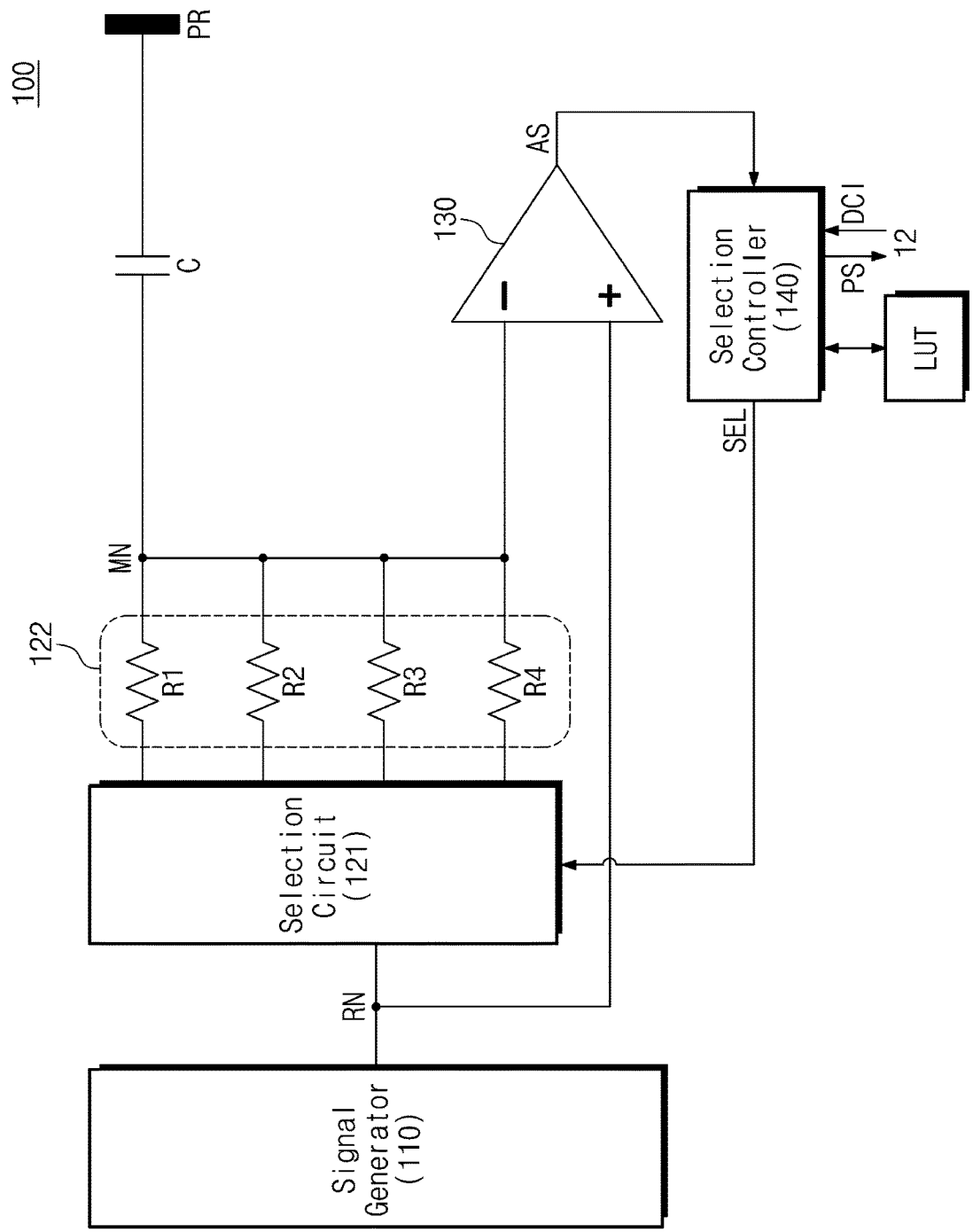
FIG. 4 is a diagram illustrating a plasma diagnostic circuit according to some embodiments of the present disclosure in detail.

FIG. 4 is a diagram illustrating a plasma diagnostic circuit according to some embodiments of the present disclosure in detail. The plasma diagnostic circuit 100 and the probe PR are illustrated in FIG. 4. The plasma diagnostic circuit 100 and the probe PR of FIG. 4 may respectively correspond to the plasma diagnostic circuit 100 and the probe PR of FIGS. 3A and 3B. The signal generator 110, the selection circuit 121, the variable amplification unit 122, the differential amplifier 130, the selection controller 140, the computing device 12, the capacitor "C", and the probe PR of FIG. 4 respectively correspond to the signal generator 110, the selection circuit 121, the variable amplification unit 122, the differential amplifier 130, the selection controller 140, the computing device 12, the capacitor "C", and the probe PR of FIG. 3B.

In FIG. 4, for brief description, additional description associated with the components described with reference to FIGS. 3A and 3B will be omitted to avoid redundancy.

The variable amplification unit 122 may include first to fourth electronic elements EE1 to EE4. Each of the first to fourth electronic elements EE1 to EE4 may be implemented with a resistor. However, the present disclosure is not limited thereto. For example, as described with reference to FIGS. 3A and 3B, the number of electronic elements and a kind of each electronic element may be different from those of FIG. 4.

For example, the first electronic element may be a first resistor R1. The second electronic element may be a second resistor R2. The third electronic element may be a second resistor R3. The fourth electronic element may be a fourth resistor. In this case, impedance values of the first to fourth resistors R1 to R4 may be different from each other.

The selection controller 140 may receive diagnosis condition information DCI from the computing device 12. The diagnosis condition information DCI may be used for the selection controller 140 to generate the selection signal SEL and may indicate preset information about the plasma diagnostic circuit 100 and the probe PR. For example, the diagnosis condition information DCI may include at least one of the area of the probe PR, the threshold current value of the probe PR, and the ADC resolution.

The plasma diagnostic circuit 100 may further include an LUT. The LUT may store a plurality of selection signals. An example in which the LUT is implemented outside the selection controller 140 is illustrated in FIG. 4, but the present disclosure is not limited thereto. For example, the selection controller 140 may include the LUT. For example, the LUT may be present in a memory of the selection controller 140.

In some embodiments, the selection controller 140 may obtain a target selection signal corresponding to the analysis signal AS from among the plurality of selection signals with reference to the LUT.

In some embodiments, the selection controller 140 may generate the selection signal SEL with reference to the LUT, based on the diagnosis condition information DCI. For example, the selection controller 140 may obtain a target selection signal corresponding to the current value of the analysis signal AS, based on the diagnosis condition information DCI. The selection controller 140 may provide the selection circuit 121 with the target selection signal as the selection signal SEL.

The LUT will be described in detail with reference to FIGS. 5 and 6.

FIG. 5 is a table describing an LUT according to some embodiments of the present disclosure. The LUT is illustrated in FIG. 5. The LUT of FIG. 5 corresponds to the LUT of FIG. 4.

The LUT may include a plurality of probe areas X1 to XM, a plurality of threshold current values Y1 to YM, a plurality of current values Z11 to ZMN, a plurality of amplification factors F11 to FMN, and a plurality of selection signals SEL11 to SELMN. Herein, "N" and "M" may be a natural number more than "1".

A probe area "X" of the LUT may indicate the area of the probe PR of FIGS. 3A, 3B, and 4. A threshold current value "Y" of the LUT may indicate the second threshold value of the probe PR of FIGS. 3A, 3B, and 4. A current value "Z" of the LUT may indicate one of current values respectively corresponding to a plurality of frequencies of the analysis signal AS of FIGS. 3A, 3B, and 4. An amplification factor "F" of the LUT may indicate the amplification factor of the target electronic element. The selection signal SEL of the LUT may indicate an electronic element corresponding to the amplification factor "F" from among a plurality of electronic elements of a variable amplification unit.

One of the plurality of probe areas X1 to XM corresponds to one of the plurality of threshold current values Y1 to YM. For example, the first probe area X1 corresponds to the first threshold current value Y1. The second probe area X2 corresponds to the second threshold current value Y2. The M-th probe area XM corresponds to the M-th threshold current value YM. As in the above description, the third to (M-1)-th probe areas X3 to XM-1 respectively correspond to the third to (M-1)-th threshold current values Y3 to YM-1.

One of the plurality of amplification factors F11 to FMN corresponds to a set of one probe area "X", one threshold current value "Y", and one current value "Z". For example, a set of the first probe area X1, the first threshold value Y1, and the first current value Z1 corresponds to the 11-th amplification factor F11. A set of the first probe area X1, the first threshold value Y1, and the N-th current value ZN corresponds to the 1N-th amplification factor F1N. A set of the second probe area X2, the second threshold value Y2, and the first current value Z1 corresponds to the 21-th amplification factor F21. A set of the second probe area X2, the second threshold value Y2, and the N-th current value ZN corresponds to the 2N-th amplification factor F2N. A set of the M-th probe area XM, the M-th threshold current value YM, and the first current value Z1 corresponds to the M1-th amplification factor FM1. A set of the M-th probe area XM, the M-th threshold current value YM, and the N-th current value ZN corresponds to the MN-th amplification factor FMN. As in the above description, each of the remaining amplification factors not described above may correspond to a set of the probe area "X", the threshold current value "Y", and the current value "Z".

One of the plurality of selection signals SEL11 to SELMN corresponds to one of the plurality of amplification factors F11 to FMN. For example, the 11-th selection signal SEL11 corresponds to the 11-th amplification factor F11. The 1N-th selection signal SEL1N corresponds to the 1N-th amplification factor F1N. The 21-th selection signal SEL21 corresponds to the 21-th amplification factor F21. The 2N-th selection signal SEL2N corresponds to the 2N-th amplification factor F2N. The M1-th selection signal SELM1 corresponds to the M1-th amplification factor FM1. The MN-th selection signal SELMN corresponds to the MN-th amplification factor FMN. As in the above description, each of the remaining selection signals not described above may correspond to one of the remaining amplification factors.

The LUT of FIG. 5 is one of some embodiments of the present disclosure, and the present disclosure is not limited thereto. The LUT may not include at least one of the probe area "X", the threshold current value "Y", the current value "Z", the amplification factor "F", and the selection signal SEL or may further include one or more variables. For example, the LUT of FIG. 5 may not include one of the probe area "X" and the threshold current value "Y" or may not include one of the amplification factor "F" and the selection signal SEL. As another example, the LUT of FIG. 5 may only include the current value "Z" and the selection signal SEL corresponding to the current value "Z".

FIG. 6 is a table describing an LUT according to some embodiments of the present disclosure. Items corresponding to the first probe area X1 and the first threshold current value Y1 from among the items of the LUT of FIG. 5 will be described in detail with reference to FIG. 6.

The plurality of current values Z1 to ZN corresponding to the first probe area X1 and the first threshold current value Y1 may include a first threshold value Th1 and the second threshold value Th2. Referring to FIG. 6, the first threshold value Th1 may be referred to as an "n-th current value Zn", and the second threshold value Th2 may be referred to as an "m-th current value Zm". Herein, "n" and "m" are a natural number less than "N", and "m" is more than "n".

An example in which the first threshold value Th1 is different from the first current value Z1 and the second threshold value Th2 is different from the N-th current value ZN is illustrated in FIG. 6, but the present disclosure is not limited thereto. For example, the first current value Z1 may be equal to the first threshold value Th1, or the N-th current value ZN may be equal to the second threshold value Th2.

A current value region including the first current value Z1 to the (n-1)-th current value Zn-1, which are smaller than the first threshold value Th1, may be referred to as a "first abnormal region". In the first abnormal region, each of the plurality of amplification factors F11 to F1n-1 may correspond to a second amplification factor greater than a first amplification factor of the default electronic element. In this case, each of the plurality of selection signals SEL11 to SEL1n-1 respectively corresponding to the plurality of amplification factors F11 to F1n-1 may indicate the target electronic element. For example, a second impedance value of the target electronic element may be greater than a first impedance value of the default electronic element.

A current value region including the n-th and m-th current values Zn to Zm, which are greater than or equal to the first threshold value Th1 and are smaller than or equal to the second threshold value Th2, may be referred to as a "linear region". In the linear region, the plurality of amplification factors F1n to F1m may be the same as the first amplification factor of the default electronic element. In this case, each of the plurality of selection signals SEL1n to SEL1m respectively corresponding to the plurality of amplification factors F1n to F1m may indicate the default electronic element.

A current value region including the (m+1)-th to N-th current values Zm+1 to ZN, which are greater than the second threshold value Th2, may be referred to as a "second abnormal region". In the second abnormal region, each of the plurality of amplification factors F1m+1 to F1N may correspond to a second amplification factor smaller than the first amplification factor of the default electronic element. In this case, each of the plurality of selection signals SELm+1 to SEL1N respectively corresponding to the plurality of amplification factors F1m+1 to F1N may indicate a second electronic element having the second amplification factor. For example, the second impedance value of the target electronic element may be smaller than the first impedance value of the default electronic element.

Although not illustrated in FIG. 6, the plurality of current values Z1 to ZN corresponding to the second probe area X2 and the second threshold current value Y2 may include a first threshold value and a second threshold value, but the first threshold value and the second threshold value may be different from the n-th current value Zn and the m-th current value Zm. As in the above description, the plurality of current values Z1 to ZN corresponding to each of the remaining probe areas X3 to XM and each of the remaining threshold current values Y3 to YM may also include a first threshold value and a second threshold value, but the first threshold value and the second threshold value may be different from the n-th current value Zn and the m-th current value Zm.

Figure 7:
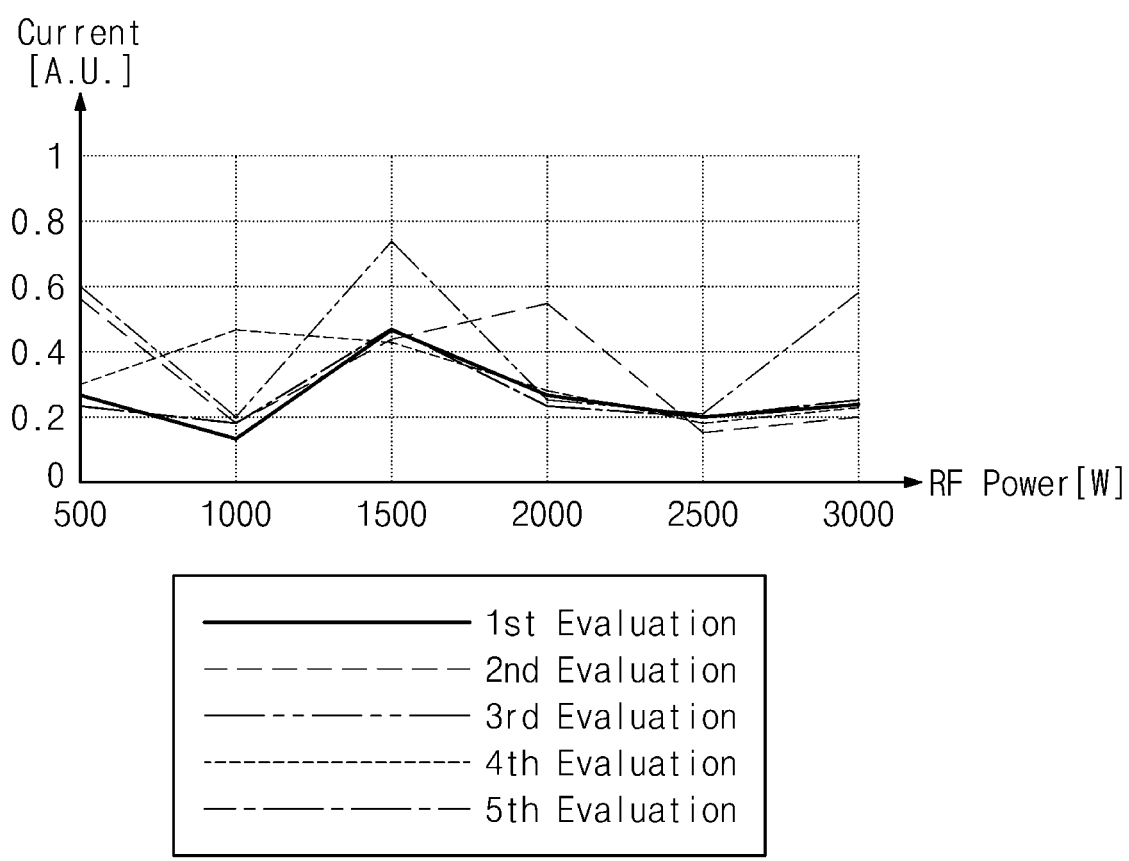
FIG. 7 is a graph illustrating a result of repeatedly evaluating a conventional plasma diagnostic circuit.

FIG. 7 is a graph illustrating a result of repeatedly evaluating a conventional plasma diagnostic circuit. An RF power vs ion current graph obtained by repeatedly evaluating a conventional plasma diagnostic circuit is illustrated in FIG. 7. The iterative evaluation graph of the conventional plasma diagnostic circuit is provided for better understanding of the present disclosure and shows only an example of the iterative evaluation result. Below, FIG. 7 will be described through the comparison with FIG. 8.

Figure 8:
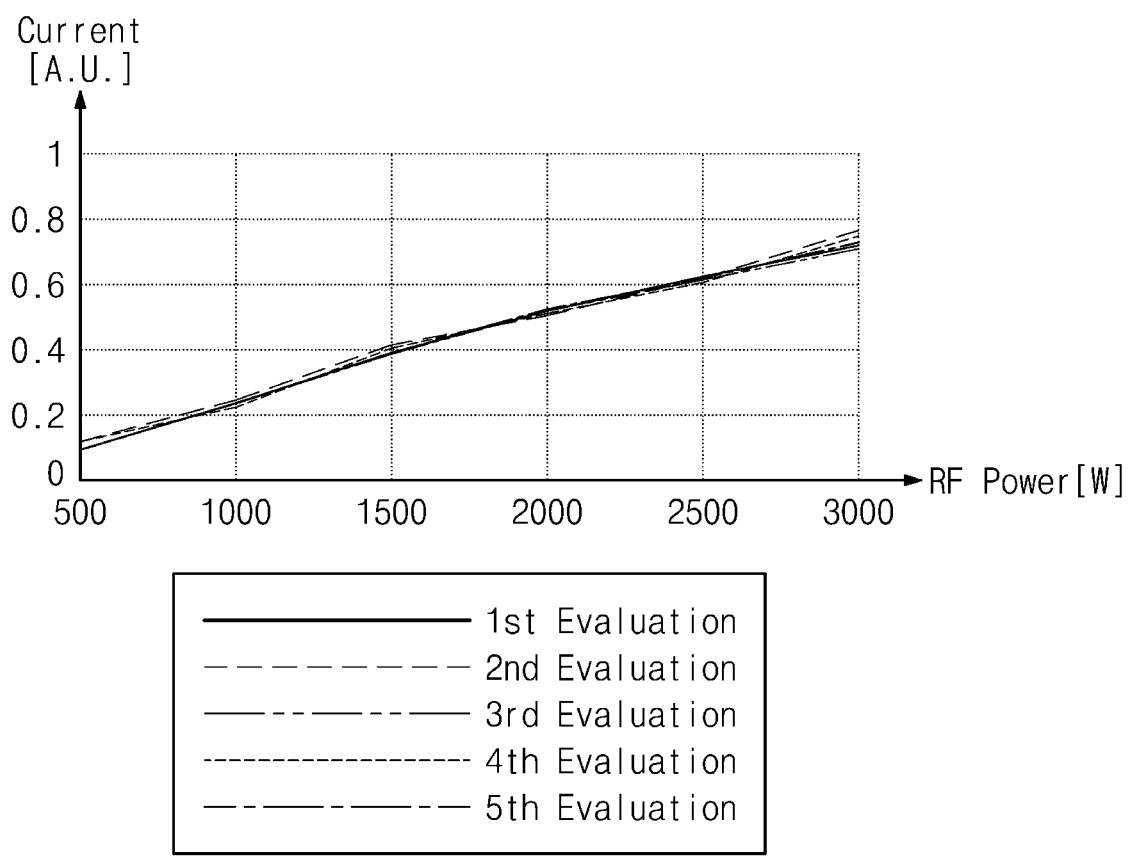
FIG. 8 is a graph illustrating a result of repeatedly evaluating a plasma diagnostic circuit according to some embodiments of the present disclosure.

FIG. 8 is a graph illustrating a result of repeatedly evaluating a plasma diagnostic circuit according to some embodiments of the present disclosure. An RF power vs ion current graph obtained by repeatedly evaluating the plasma diagnostic circuit according to some embodiments of the present disclosure is illustrated in FIG. 8. The plasma diagnostic circuit of FIG. 8 may correspond to the plasma diagnostic circuit 100 of FIGS. 1, 3, and 4.

In FIGS. 7 and 8, a horizontal axis represents an RF power that a plasma generator supplies to a chamber, and a vertical axis represents a current value corresponding to a second frequency of an analysis signal. For example, the second frequency may be N times the frequency of the AC signal that the signal generator generates. Herein, "N" may be a natural number more than 1.

FIGS. 7 and 8 are graphs illustrating results of evaluating the conventional plasma diagnostic circuit and the plasma diagnostic circuit according to some embodiments of the present disclosure 5 times under the same condition and the 5 evaluation results are shown by different lines.

The first to fifth evaluation graphs of FIG. 8 are close in common to a linear graph in which the ion current value increases as the RF power increases. Also, when the same RF power is applied, there is almost no difference between the ion current values in the first to fifth evaluation graphs.

In contrast, the first to fifth evaluation graphs of FIG. 7 are non-linear graphs whose shapes are different from each other. Also, when the same RF power is applied, compared to FIG. 8, there is a great difference between the ion current values in the first to fifth evaluation graphs.

In detail, when the RF power is 500 W, the ion current values of the second and fourth evaluations are more than two times the ion current values of the first, third, and fifth evaluations. When the RF power is 1000 W, the ion current value of the fourth evaluation is more than two times the ion current values of the remaining evaluations. When the RF power is 1500 W, the ion current value of the third evaluation are close to two times the ion current values of the remaining evaluations. When the RF power is 2000 W, the ion current value of the second evaluation are more than two times the ion current values of the remaining evaluations. When the RF power is 2500 W, differences between the first to fifth evaluations are not great but are not identical. When the RF power is 3000 W, the ion current value of the third evaluation are more than two times the ion current values of the remaining evaluations.

In other words, compared to the case where the conventional plasma diagnostic circuit is used, when the plasma diagnostic circuit according to the present disclosure is used, the RF power vs ion current graph may be close to the linear graph. This may mean that the accuracy of diagnosis is improved.

Figure 9:
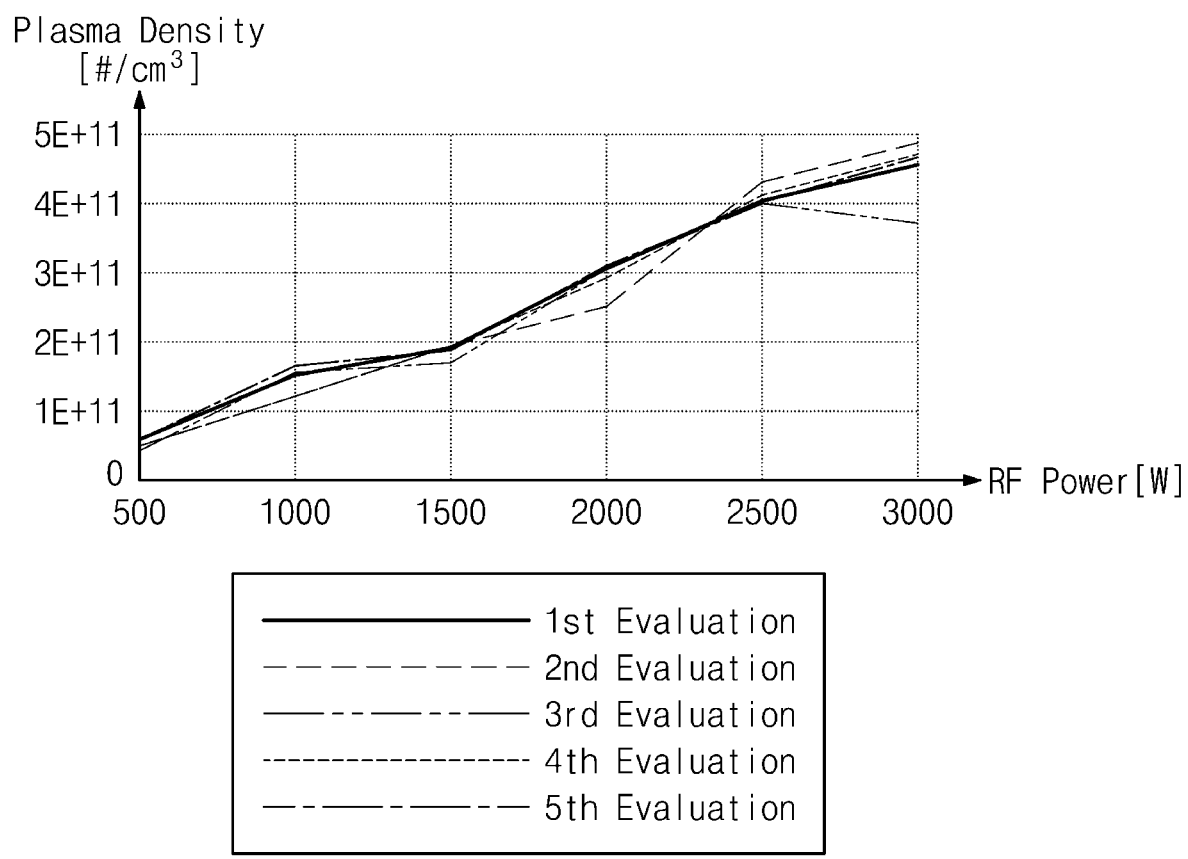
FIG. 9 is a graph illustrating a result of repeatedly evaluating a conventional plasma diagnostic circuit.

FIG. 9 is a graph illustrating a result of repeatedly evaluating a conventional plasma diagnostic circuit. An RF power vs plasma density graph obtained by repeatedly evaluating a conventional plasma diagnostic circuit is illustrated in FIG. 9. The iterative evaluation graph of the conventional plasma diagnostic circuit is provided for better understanding of the present disclosure and shows only an example of the iterative evaluation result. Below, FIG. 9 will be described through the comparison with FIG. 10.

Figure 10:
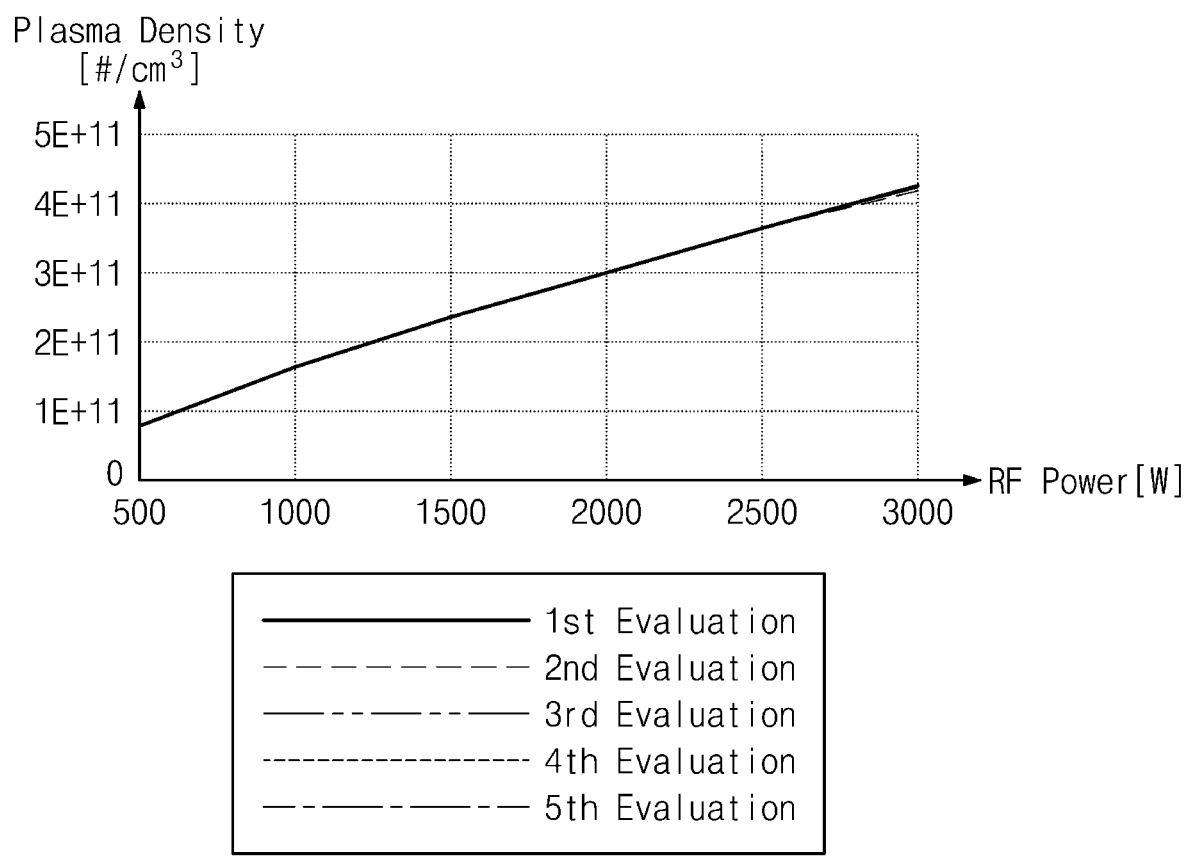
FIG. 10 is a graph illustrating a result of repeatedly evaluating a plasma diagnostic circuit according to some embodiments of the present disclosure.

FIG. 10 is a graph illustrating a result of repeatedly evaluating a plasma diagnostic circuit according to some embodiments of the present disclosure. An RF power vs plasma density graph obtained by repeatedly evaluating the plasma diagnostic circuit according to some embodiments of the present disclosure is illustrated in FIG. 10. The plasma diagnostic circuit of FIG. 10 may correspond to the plasma diagnostic circuit 100 of FIGS. 1, 3, and 4.

In FIGS. 9 and 10, a horizontal axis represents an RF power that a plasma generator supplies to a chamber, and a vertical axis represents a plasma density calculated based on an analysis signal. For example, the plasma density may be a result calculated by the computing device 12 of FIG. 1 based on a current value corresponding to a second frequency of the analysis signal. The second frequency may be N times the frequency of the AC signal that the signal generator generates. Herein, "N" may be a natural number more than 1. FIGS. 9 and 10 are graphs illustrating results of evaluating the conventional plasma diagnostic circuit and the plasma diagnostic circuit according to some embodiments of the present disclosure 5 times under the same condition and the 5 evaluation results are shown by different lines.

The first to fifth evaluation graphs of FIG. 10 are close in common to a linear graph in which the plasma density increases as the RF power increases. Also, when the same RF power is applied, there is almost no plasma density difference in the first to fifth evaluation graphs.

In contrast, the first to fifth evaluation graphs of FIG. 9 are non-linear graphs in which when the RF power increases, the plasma density generally increases but whose shapes are different from each other. Also, when the same RF power is applied, compared to FIG. 10, there is a great plasma density difference in the first to fifth evaluation graphs.

In detail, when the RF power is 1000 W, the plasma density of the fourth evaluation is smaller than the plasma densities of the remaining evaluations. When the RF power is 2000 W, the plasma density of the second evaluation is smaller than the plasma densities of the remaining evaluations. When the RF power is 3000 W, the plasma density of the third evaluation is smaller than the plasma densities of the remaining evaluations, and the plasma density of the third evaluation when the RF power is 3000 W is smaller than the plasma density of the third evaluation when the RF power is 2500 W.

In other words, compared to the case where the conventional plasma diagnostic circuit is used, when the plasma diagnostic circuit according to the present disclosure is used, the RF power vs plasma density graph may be close to the linear graph. This may mean that the accuracy of diagnosis is improved.

Figure 11:
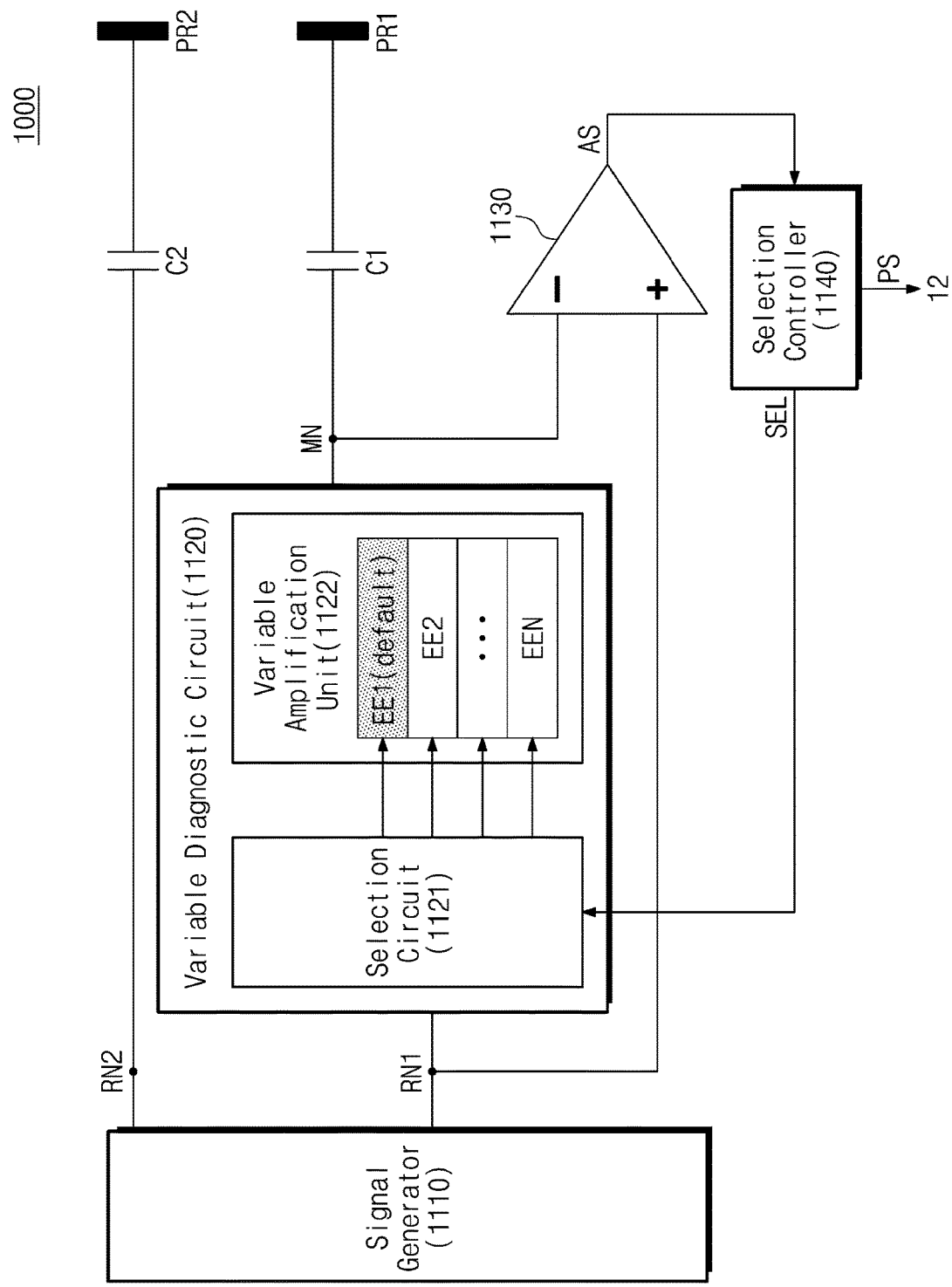
FIG. 11 is a diagram illustrating a plasma diagnostic circuit according to some embodiments of the present disclosure in detail.

FIG. 11 is a diagram illustrating a plasma diagnostic circuit according to some embodiments of the present disclosure in detail. FIG. 11 shows a circuit diagram of a plasma diagnostic circuit 1000 that uses a plurality of probes. A signal generator 1110, a variable diagnostic circuit 1120, a differential amplifier 1130, a selection controller 1140, and a first probe PR1 of FIG. 11 may correspond to the signal generator 110, the variable diagnostic circuit 120, the differential amplifier 130, the selection controller 140, and the probe PR of FIGS. 3A, 3B, and 4. In FIG. 11, for brief description, additional description associated with the components described with reference to FIGS. 3A, 3B, and 4 will be omitted to avoid redundancy.

The case of including two probes is illustrated in FIG. 11, but the present disclosure is not limited thereto.

The plasma diagnostic circuit 1000 may further include a second probe PR2 and a second capacitor C2. For example, the second probe PR2 may be the same as the first probe PR1, and the second capacitor C2 may be the same as a first capacitor C1.

The signal generator 1110 may output a first AC signal and a second AC signal to a first reference node RN1 and a second reference node RN2, respectively.

In some embodiments, the first AC signal and the second AC signal may have a phase difference of 180 degrees.

In some embodiments, the signal generator 1110 may include a first signal generator and a second signal generator. The first signal generator may output the first AC signal to the first reference node RN1. The second signal generator may output the second AC signal to the second reference node RN2.

In some embodiments, the signal generator 1110 may include a bipolar power supplier.

The second probe PR2 may be connected to the second reference node RN2 and may be inserted into the chamber so as to be spaced from the first probe PR1.

Before the selection signal SEL is received, a selection circuit 1121 may connect the first electronic element EE1 of a variable amplification unit 1122, that is, the default electronic element between the first reference node RN1 and the measurement node MN.

When the plasma is present in the chamber, an ion current corresponding to the first AC signal and the second AC signal may flow through the variable diagnostic circuit 1120, the first probe PR1, and the second probe PR2.

As in the differential amplifier 1130 of FIGS. 3A, 3B, and 4, the differential amplifier 1130 may amplify a difference between the first voltage of the first reference node RN1 and the second voltage of the measurement node MN and may generate the analysis signal AS.

The selection controller 1140 may generate the selection signal SEL based on the analysis signal AS. The selection controller 1140 may perform signal processing with respect to the analysis signal AS and may generate the processed signal PS. The selection controller 1140 may provide the processed signal PS to the computing device 12 of FIG. 1.

Although not illustrated in FIG. 11, like FIG. 4, the selection controller 1140 may receive diagnosis condition information from the computing device 12 of FIG. 1 and may generate the selection signal SEL with reference to the analysis signal AS, the diagnosis condition information, and the LUT.

For example, compared to the LUT illustrated in FIGS. 5 and 6, the LUT which the selection controller 1140 of FIG. 11 refers to may further include the area of the second probe PR2 and the threshold current value of the second probe PR2 as additional variables.

The selection circuit 1121 may connect the second electronic element EE2, that is, the target electronic element between the first reference node RN1 and the measurement node MN based on the selection signal SEL. In this case, the selection circuit 1121 may disconnect the first electronic element EE1 from at least one of the first reference node RN1 and the measurement node MN.

Figure 12:
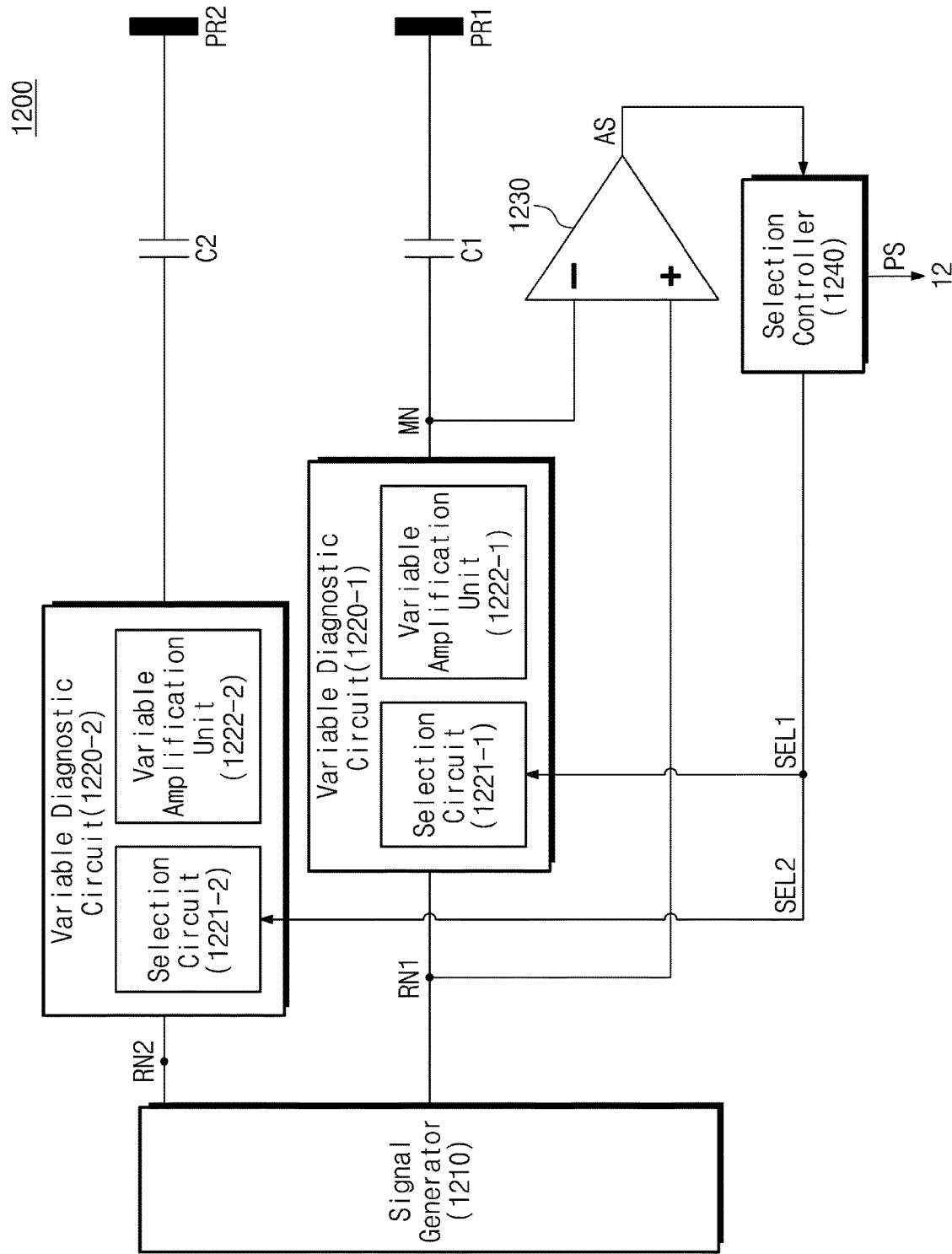
FIG. 12 is a diagram illustrating a plasma diagnostic circuit according to some embodiments of the present disclosure in detail.

FIG. 12 is a diagram illustrating a plasma diagnostic circuit according to some embodiments of the present disclosure in detail. A plasma diagnostic circuit 1200 that uses a plurality of probes is illustrated in FIG. 12. A signal generator 1210, a variable diagnostic circuit 1220-1, a differential amplifier 1230, a selection controller 1240, a first probe PR1, a second probe PR2, a first capacitor C1, and a second capacitor C2 of FIG. 12 respectively correspond to the signal generator 1110, the variable diagnostic circuit 1120, the differential amplifier 1130, the selection controller 1140, the first probe PR1, the second probe PR2, the first capacitor C1, and the second capacitor C2 of FIG. 11.

In FIG. 12, for brief description, additional description associated with the components described with reference to FIG. 11 will be omitted to avoid redundancy.

The plasma diagnostic circuit 1200 using two probes PR1 and PR2 is illustrated in FIG. 12, but the present disclosure is not limited thereto.

The plasma diagnostic circuit 1200 may include two variable diagnostic circuits 1220-1 and 1220-2.

The variable diagnostic circuit 1220-1 may include a selection circuit 1221-1 and a variable amplification unit 1222-1. The variable amplification unit 1222-1 may include a plurality of electronic elements including a first default electronic element and a first target electronic element.

Before a first selection signal SEL1 is received, the selection circuit 1221-1 may connect the first default electronic element between the first reference node RN1 and the measurement node MN. In this case, the selection circuit 1221-1 may float the remaining electronic elements.

The selection circuit 1221-1 may receive the first selection signal SEL1 and may connect the first target electronic element between the first reference node RN1 and the measurement node MN based on the first selection signal SEL1. In this case, the selection circuit 1221-1 may disconnect the first default electronic element from at least one of the first reference node RN1 and the measurement node MN.

The variable diagnostic circuit 1220-2 may include a selection circuit 1221-2 and a variable amplification unit 1222-2. The variable amplification unit 1222-2 may include a plurality of electronic elements including a second default electronic element and a second target electronic element.

Before a second selection signal SEL2 is received, the selection circuit 1221-2 may connect the second default electronic element between the second reference node RN2 and the second capacitor C2. In this case, the selection circuit 1221-1 may float the remaining electronic elements.

The selection circuit 1221-2 may receive the second selection signal SEL2 and may connect the second target electronic element between the second reference node RN2 and the second capacitor C2 based on the second selection signal SEL2. In this case, the selection circuit 1221-2 may disconnect the second default electronic element from at least one of the second reference node RN2 and the second capacitor C2.

As in the differential amplifier 1130 of FIG. 11, the differential amplifier 1230 may amplify a difference between the first voltage of the first reference node RN1 and the second voltage of the measurement node MN and may generate the analysis signal AS.

Like the selection controller 1140 of FIG. 11, the selection controller 1240 may generate the first selection signal SEL1 and the second selection signal SEL2 based on the analysis signal AS.

In some embodiments, the first selection signal SEL1 may be the same as the second selection signal SEL2.

In some embodiments, the selection controller 1240 may receive diagnosis condition information from the computing device 12 of FIG. 1. The selection controller 1240 may generate the first selection signal SEL1 and the second selection signal SEL2 with reference to the analysis signal AS, the diagnosis condition information, and the LUT.

For example, compared to the LUT illustrated in FIGS. 5 and 6, the LUT which the selection controller 1240 of FIG. 12 refers to may further include the area of the second probe PR2, the threshold current value of the second probe PR2, the second amplification factor, and the second selection signal SEL2 as additional variables.

Figure 13:
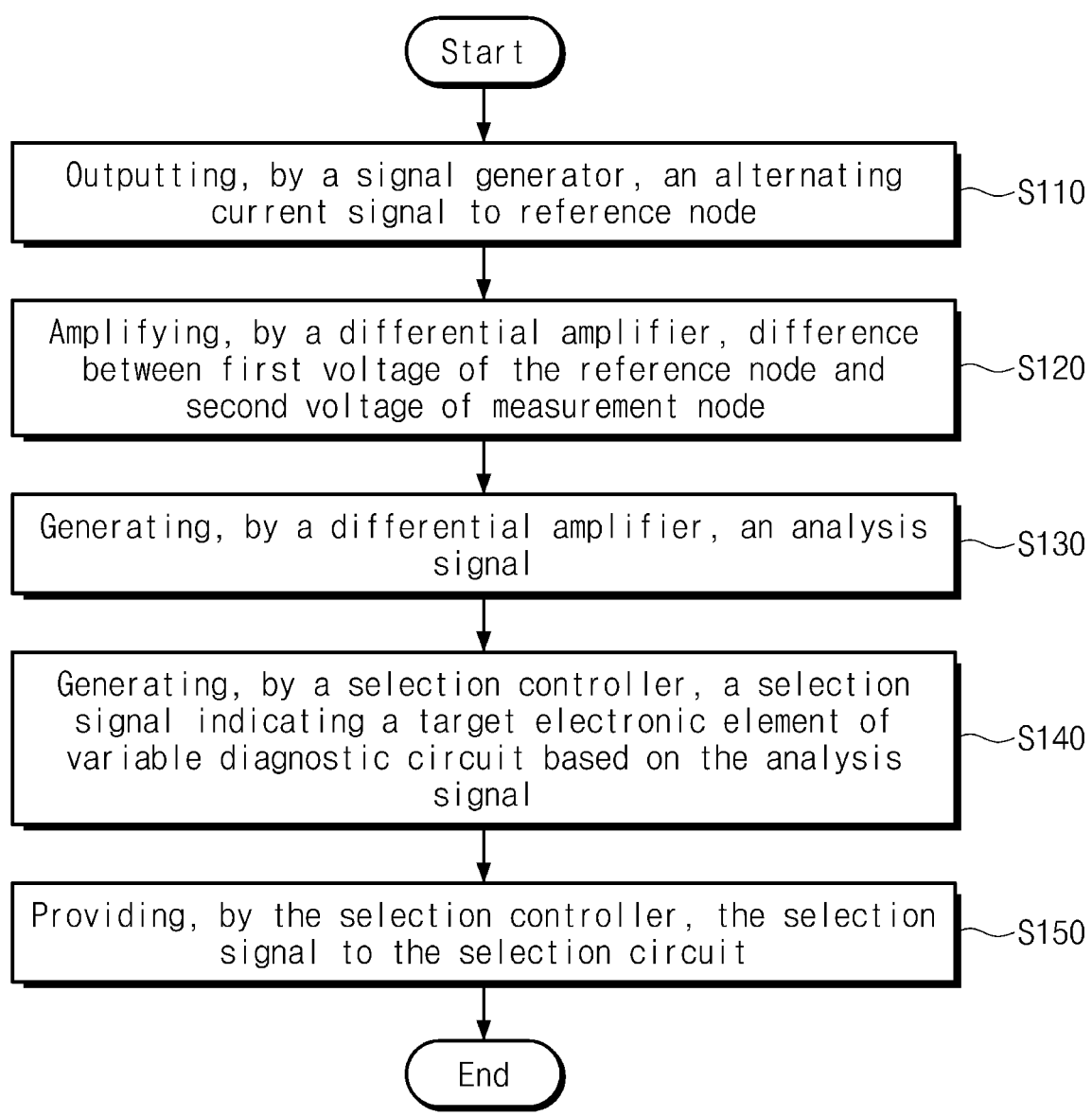
FIG. 13 is a flowchart describing an operating method of a plasma diagnostic circuit according to some embodiments of the present disclosure.

FIG. 13 is a flowchart describing an operating method of a plasma diagnostic circuit according to some embodiments of the present disclosure. An operating method of a plasma diagnostic circuit will be described with reference to FIG. 13.

A plasma diagnostic circuit and a first probe to be described with reference to FIG. 13 respectively correspond to the plasma diagnostic circuit 100 and the first probe PR1 of FIGS. 1, 3A, 3B, and 4. The plasma diagnostic circuit may include a signal generator, a selection circuit, a variable amplification unit, a differential amplifier, and a selection controller. In this case, the variable amplification unit may include a plurality of electronic elements. For example, the variable amplification unit may include a default electronic element and a target electronic element.

In operation S110, the signal generator of the plasma diagnostic circuit may output an AC signal to a reference node. For example, the AC signal may be a sinusoidal AC signal. In this case, the default electronic element of the variable diagnostic circuit may be connected between the reference node and a measurement node, and the remaining electronic elements of the variable diagnostic circuit may be floated.

In some embodiments, the impedance value of the default electronic element may be different from the impedance value of the target electronic element.

In some embodiments, each of the default electronic element and the target electronic element may include at least one of a passive element and an active element. In operation S120, the differential amplifier of the plasma diagnostic circuit may amplify a difference between a first voltage of the reference node and a second voltage of the measurement node.

In operation S130, the differential amplifier of the plasma diagnostic circuit may generate an analysis signal. In detail, the differential amplifier may generate the analysis signal based on the impedance value of the default electronic element and the difference between the first voltage and the second voltage.

In operation S140, the selection controller of the plasma diagnostic circuit may generate a selection signal based on the analysis signal.

In some embodiments, operation S140 may include receiving, by the selection controller, the analysis signal and obtaining, by the selection controller, a target selection signal corresponding to the analysis signal from among a plurality of selection signals with reference to an LUT.

In some embodiments, the obtaining of the target selection signal corresponding to the analysis signal from among the plurality of selection signals with reference to the LUT by the selection controller may include receiving diagnosis condition information from an external computing device and obtaining the target selection signal corresponding to the analysis signal and the diagnosis condition information from among the plurality of selection signals with reference to the LUT.

In some embodiments, operation S140 may include generating, by the selection controller, a processed signal by performing signal processing with respect to the analysis signal, providing, by the selection controller, the processed signal to the computing device, and generating, by the selection controller, the selection signal with reference to the processed signal and the LUT.

Operation S140 will be described in detail with reference to FIG. 14.

In operation S150, the selection controller of the plasma diagnostic circuit may provide the selection signal to the selection circuit.

In some embodiments, operation S150 may further include receiving, by the selection circuit, the selection signal, disconnecting, by the selection circuit, the default electronic element from at least one of the reference node and the measurement node, and connecting, by the selection circuit, the target electronic element between the reference node and the measurement node.

FIG. 14 is a flowchart describing an operating method of a selection controller according to some embodiments of the present disclosure. An operating method of a selection controller will be described with reference to FIG. 14. A selection controller of FIG. 14 corresponds to the selection controller 140 of FIGS. 3A, 3B, and 4 or the selection controller 1140 of FIG. 11.

In operation S210, the selection controller may receive the analysis signal from the differential amplifier.

In operation S220, the selection controller may determine whether a current value of the analysis signal is smaller than a first threshold value.

In some embodiments, the first threshold value may be the same as the resolution of the ADC.

When it is determined that the current value of the analysis signal is smaller than the first threshold value, the selection controller may perform operation S221. When it is determined that the current value of the analysis signal is not smaller than the first threshold value, the selection controller may perform operation S230.

In operation S221, the selection controller may generate the selection signal indicating the target electronic element having a second amplification factor greater than a first amplification factor. The first amplification factor may indicate the amplification factor of the default electronic element.

In operation S230, the selection controller may determine whether the current value of the analysis signal is greater than a second threshold value.

In some embodiments, the second threshold value may be determined by the area of a probe that the plasma diagnostic circuit uses.

When it is determined that the current value of the analysis signal is greater than the second threshold value, the selection controller may perform operation S231. When it is determined that the current value of the analysis signal is not greater than the second threshold value, the selection controller may perform operation S240.

In operation S231, the selection controller may generate the selection signal indicating the target electronic element having a second amplification factor smaller than the first amplification factor. The first amplification factor may indicate the amplification factor of the default electronic element.

In operation S240, the selection controller may provide the analysis signal to the external computing device. The external computing device corresponds to the computing device 12 of FIG. 1.

According to embodiments of the present disclosure, a plasma diagnostic circuit including a variable amplification unit and operating method thereof are provided.

Also, a plasma diagnostic circuit that improves accuracy and efficiency by accurately measuring a plasma density of a wide range without needing to replace a probe depending on the plasma density or to change a configuration of the plasma diagnostic circuit and an operating method thereof are provided.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A plasma diagnostic circuit comprising:
a signal generator configured to output a first alternating current (AC) signal to a first reference node;
a variable diagnostic circuit comprising a plurality of electronic elements, wherein one of the plurality of electronic elements is a default electronic element connected between the first reference node and a measurement node, and other ones of the plurality of electronic elements are floated;
a first probe connected to the measurement node, wherein the first probe is exposed to plasma in a chamber;
a differential amplifier configured to amplify a difference between a first voltage of the first reference node and a second voltage of the measurement node and to generate an analysis signal; and
a selection controller configured to output a selection signal to the variable diagnostic circuit responsive to the analysis signal, wherein the selection signal indicates a target electronic element among the plurality of electronic elements.

2. The plasma diagnostic circuit of claim 1, wherein the variable diagnostic circuit further comprises:
a selection circuit configured to connect the target electronic element between the first reference node and the measurement node responsive to on the selection signal and to float the default electronic element.

3. The plasma diagnostic circuit of claim 2, wherein the selection circuit comprises a switch circuit or a multiplexer.

4. The plasma diagnostic circuit of claim 1, wherein a first impedance value of the default electronic element is different from a second impedance value of the target electronic element.

5. The plasma diagnostic circuit of claim 1, wherein the selection controller is further configured to:
determine whether a current value of the analysis signal is smaller than a first threshold value; and
in response to determining that the current value of the analysis signal is smaller than the first threshold value, generate the selection signal indicating the target electronic element having a second impedance value greater than a first impedance value of the default electronic element.

6. The plasma diagnostic circuit of claim 1, wherein the selection controller is further configured to:
determine whether a current value of the analysis signal is greater than a second threshold value; and
in response to determining that the current value of the analysis signal is greater than the second threshold value, generate the selection signal indicating the target electronic element having a second impedance value smaller than a first impedance value of the default electronic element.

7. The plasma diagnostic circuit of claim 1, wherein the signal generator is configured to output a second AC signal to a second reference node,
wherein the plasma diagnostic circuit further comprises:
a second probe connected to the second reference node, and wherein the second probe is exposed to the plasma in the chamber and spaced apart from the first probe.

8. The plasma diagnostic circuit of claim 7, wherein the first AC signal and the second AC signal have a phase difference of 180 degrees.

9. The plasma diagnostic circuit of claim 1, further comprising:
a lookup table (LUT) configured to store a plurality of selection signals, each selection signal respectively corresponding to one of the plurality of electronic elements,
wherein the selection controller is further configured to:
obtain a target selection signal corresponding to the analysis signal from among the plurality of selection signals with reference to the LUT; and
provide the target selection signal as the selection signal to the variable diagnostic circuit.

10. The plasma diagnostic circuit of claim 9, wherein the selection controller is further configured to:
receive diagnosis condition information from an external computing device; and
obtain the target selection signal corresponding to the analysis signal and the diagnosis condition information from among the plurality of selection signals with reference to the LUT, and
wherein each of the plurality of selection signals of the LUT corresponds to:
a current value of the analysis signal; or
all of an area of the first probe, a threshold current value of the first probe, and the current value of the analysis signal.

11. The plasma diagnostic circuit of claim 1, wherein each of the plurality of electronic elements comprises at least one of a resistor, an inductor, a capacitor, and an operational (OP) amplifier.

12. A plasma diagnostic circuit comprising:
a signal generator configured to output a first AC signal to a first reference node and to output a second AC signal to a second reference node;
a first variable diagnostic circuit comprising a plurality of first electronic elements, wherein one of the plurality of first electronic elements is a first default electronic element that is connected between the first reference node and a measurement node, and other ones of the plurality of first electronic elements are floated;
a first probe connected to the measurement node, wherein the first probe is exposed to plasma in a chamber;
a second probe is exposed to the plasma in the chamber and is spaced apart from the first probe;
a second variable diagnostic circuit comprising a plurality of second electronic elements, wherein one of the plurality of second electronic elements is a second default electronic element that is connected between the second reference node and the second probe, and other ones of the plurality of second electronic elements are floated;
a differential amplifier configured to amplify a difference between a first voltage of the first reference node and a second voltage of the measurement node and to generate an analysis signal; and
a selection controller configured to output a first selection signal to the first variable diagnostic circuit and output a second selection signal to the second variable diagnostic circuit responsive to the analysis signal, wherein the first selection signal indicates a first target electronic element among the floated other ones of the plurality of first electronic elements and the second selection signal indicates a second target electronic element among the floated other ones of the plurality of second electronic elements.

13. The plasma diagnostic circuit of claim 12, wherein the first variable diagnostic circuit further comprises a first selection circuit configured to float the first default electronic element and connect the first target electronic element between the first reference node and the measurement node responsive to the first selection signal; and
wherein the second variable diagnostic circuit further comprises a second selection circuit configured to float the second default electronic element and connect the second target electronic element between the second reference node and the second probe responsive to the second selection signal.

14. The plasma diagnostic circuit of claim 13, wherein each of the first selection circuit and the second selection circuit comprises a switch circuit or a multiplexer.

15. The plasma diagnostic circuit of claim 12, wherein a first impedance value of the first default electronic element is different from a second impedance value of the first target electronic element; and
wherein a third impedance value of the second default electronic element is different from a fourth impedance value of the second target electronic element.

16. The plasma diagnostic circuit of claim 12, wherein the selection controller further configured to:
determine whether a current value of the analysis signal is smaller than a first threshold value;
generate, in response to determining that the current value of the analysis signal is smaller than the first threshold value, the first selection signal indicating the first target electronic element having a second impedance value greater than a first impedance value of the first default electronic element;
generate, in response to determining that the current value of the analysis signal is smaller than the first threshold value, the second selection signal indicating the second target electronic element having a third impedance value greater than a fourth impedance value of the second default electronic element; and
output the first selection signal and the second selection signal to the first variable diagnostic circuit and the second variable diagnostic circuit, respectively.

17. The plasma diagnostic circuit of claim 12, wherein the selection controller further configured to:
determine whether a current value of the analysis signal is greater than a first threshold value;
generate, in response to determining that the current value of the analysis signal is greater than the first threshold value, the first selection signal indicating the first target electronic element having a second impedance value smaller than a first impedance value of the first default electronic element;
generate, in response to determining that the current value of the analysis signal is greater than the first threshold value, the second selection signal indicating the second target electronic element having a third impedance value smaller than a fourth impedance value of the second default electronic element; and
output the first selection signal and the second selection signal to the first variable diagnostic circuit and the second variable diagnostic circuit, respectively.

18. The plasma diagnostic circuit of claim 12, wherein each of the plurality of first electronic elements and the plurality of second electronic elements comprises at least one of a resistor, an inductor, a capacitor, and an operational (OP) amplifier.

19. A plasma diagnostic circuit comprising:
a signal generator configured to output a first AC signal to a first reference node and to output a second AC signal to a second reference node;
a variable diagnostic circuit comprising a plurality of electronic elements, wherein one of the plurality of electronic elements is a default electronic element that is connected between the first reference node and a measurement node, and other ones of the plurality of electronic elements are floated;
a first probe connected to the measurement node, wherein the first probe is exposed to plasma in a chamber;
a second probe connected to the second reference node, wherein the second probe is exposed to the plasma in the chamber and is spaced apart from the first probe;
a differential amplifier configured to amplify a difference between a first voltage of the first reference node and a second voltage of the measurement node and to generate an analysis signal; and
a selection controller configured to output a selection signal to the variable diagnostic circuit responsive to the analysis signal, wherein the selection signal indicates a target electronic element among the floated other ones of the plurality of electronic elements.

20. The plasma diagnostic circuit of claim 19, wherein a first impedance value of the default electronic element is different from a second impedance value of the target electronic element, and
wherein the variable diagnostic circuit further comprises:
a selection circuit configured to connect the target electronic element between the first reference node and the measurement node responsive to the selection signal and to float the default electronic element.

* * * * *